(12) United States Patent
Donahue

(10) Patent No.: US 7,024,397 B1
(45) Date of Patent: Apr. 4, 2006

(54) METHOD AND APPARATUS FOR NEGOTIATING A REAL ESTATE LEASE USING A COMPUTER NETWORK

(75) Inventor: John J. Donahue, Melrose, MA (US)

(73) Assignee: J. J. Donahue & Company, Boston, MA (US)

(*) Notice: Subject to any disclaimer, the term of this patent is extended or adjusted under 35 U.S.C. 154(b) by 1180 days.

(21) Appl. No.: 09/610,005

(22) Filed: Jul. 5, 2000

(51) Int. Cl.
*G06F 17/60* (2006.01)

(52) U.S. Cl. .............................. 705/80; 705/1; 705/37; 713/176

(58) Field of Classification Search .................... 705/1, 705/10, 80, 37; 713/176
See application file for complete search history.

(56) References Cited

U.S. PATENT DOCUMENTS

| | | | |
|---|---|---|---|
| 5,875,431 A | 2/1999 | Heckman et al. | |
| 5,897,621 A * | 4/1999 | Boesch et al. | 705/26 |
| 5,999,908 A | 12/1999 | Abelow | |
| 6,067,531 A * | 5/2000 | Hoyt et al. | 705/35 |
| 6,112,189 A * | 8/2000 | Rickard et al. | 705/37 |
| 6,131,087 A * | 10/2000 | Luke et al. | 705/26 |
| 6,141,653 A | 10/2000 | Conklin et al. | |
| 6,321,202 B1 * | 11/2001 | Raveis, Jr. | 705/1 |
| 6,502,113 B1 * | 12/2002 | Crawford et al. | 715/530 |
| 2001/0005829 A1 | 6/2001 | Raveis, Jr. | |
| 2002/0046159 A1 | 4/2002 | Raveis, Jr. | |
| 2002/0049624 A1 | 4/2002 | Ketterer | |
| 2002/0052814 A1 | 5/2002 | Ketterer | |
| 2002/0065739 A1 | 5/2002 | Florance et al. | |
| 2002/0095311 A1 * | 7/2002 | Donahue | 705/1 |

FOREIGN PATENT DOCUMENTS

| | | |
|---|---|---|
| JP | 2002-7542 | 1/2002 |
| WO | WO 98/58338 | 6/1998 |

OTHER PUBLICATIONS www.loopnet.com, Information printed from website on Apr. 3, 2001: Homepage, Search properties, and Property matching services, 10 pages.

(Continued)

*Primary Examiner*—James P. Trammell
*Assistant Examiner*—Daniel L. Greene
(74) *Attorney, Agent, or Firm*—Banner & Witcoff, Ltd.

(57) ABSTRACT

The invention provides a system and method that facilitates a structured lease negotiation between two parties to a real estate transaction, and subsequent steps to occupy the leased premises and evaluate the transaction process. A series of predefined milestone negotiation steps are executed on a computer that couples two parties through a network, such as the Internet. The negotiators use a web browser to answer predefined questions regarding a proposed transaction in such a manner that certain aspects of the transaction can be agreed upon early during the negotiation process while others are deferred to later phases. In each phase, each party must select from a predefined list of actions (e.g., agree, defer, identify, mediate, etc.) associated with a particular aspect of the negotiation (e.g., rent to be charged, term of the lease, etc.). Tools are provided to facilitate transnational aspects of the negotiation (e.g., conversion between currencies, metrics, or languages). Third-party service providers such as brokers and architects can be automatically pulled into the negotiations using computer-issued requests for services. Feedback from the parties in the form of problems encountered and solutions achieved during the negotiation process are collected and stored in a database for review and use by other future negotiation parties.

54 Claims, 22 Drawing Sheets

OTHER PUBLICATIONS www.propertyfirst.com, Information printed from website on Apr. 3, 2001: Homepage, Search properties, and Broker directory, 8 pages.

www.egpropertylink.com, Information printed from website on Apr. 3, 2001: Homepage, Smart search and Investment search, 5 pages.

* cited by examiner

Issue Lease Proposal

TO:
FROM:
RE:
DATE:
Name of Recipient:
Landlord or Current Tenant:
Company Name of Tenant:
Office Location:
Size:
Address of Proposed office:
Current Measurement of Space:
Lease Term:
Rent:
Lease Start:
Rent Start:
Rent Increase:
Landlord's Work:

Other Improvements:

Break Option:

Renewal Option:

Expansion Option:

Charges:

Parking:

Termination:

Name of Sender:

[Back] [Next]

FIG. 16

Preview

Lease Proposal

TO: Robert Andrews

FROM: Joe Smith

RE: KPMG Boston

DATE: 6/16/2000

Dear Robert Andrews

The following is a proposal for the lease or sublease of offices of [insert name of landlord or current tenant] by [Company Name] at Leatherhead, England

Premises: circa 1000 m2 [compute sq. ft.] of rentable space on the 850 floor- of the xxxx building located at [insert address]. Space to be measured based on [current measurement of space or prevailing market practices].

Lease Term: [insert number of years or months]

Rent: $400 per m2

Lease Start: [insert date for commencement of the lease]

Rent Start: [insert date for start of rent if after Lease Start]

Rent Increase: [insert CPI/indexation if any or other rent increase]

Landlord's Work: [insert condition in which landlord is to deliver the office premises if the landlord is responsible to make any alternations, linking if required to a separate document that describes the works, and whether the cost is paid by the landlord, paid by the tenant, or shared between the parties]

Other Improvements: [insert other improvements provided by landlord in the premises including furniture, network systems or telecommunications systems,, linking if required to a separate document with a more detailed description or inventory of improvements]

Break Option: [insert any options granted to tenant to terminate the lease before the end of the lease term including the effective date of break, required advance notice, and payment of penalties (if any) to landlord

Renewal Option: [insert any options granted to tenant to renew the office premises including the number of lease terms, the advance notice, and method for calculation of rent increase].

Expansion Option: [insert any options granted to tenant to lease additional office space in

FIG. 17A the buildling or buildings in which the offices are located, including any rights of refusal to lease additional space].

Charges: [insert rent cost per m$^2$ in local currency and convert to $ per sq. ft. of any operating expenses to be paid by tenant for use of office space]

Parking: [insert the number of parking spaces to be rented and the annual cost per space in local currency and convert to $ per sq. ft.]

Termination: [insert the condition in which the tenant must leave the premises upon termination of the lease, choosing among a) return the premises to the landlord in good condition, reasonable wear and tear excepted, b) return the premises to the landlord in its original condition with no allowance for reasonable wear, or c) other condition to be mutually agreed.]

This proposal is subject to the approval of [insert company name of tenant] corporate management. Under no circumstances shall this proposal constitute a binding legal commitment on behalf of [insert company name of tenant] to lease the above premises.

Please confirm in writing that the above proposed terms and conditions are acceptable. Thank you.

Best regards,

Joe Smith

[Done]

FIG. 17B

Global Lease Link

Project Number xxxx

Preliminary Project Schedule

| | | |
|---|---|---|
| I. | Confirm Lease Proposal & Agree Schedule | 23 Jun 2000 |
| II. | Resolve Outstanding Business Issues | 30 Jun 2000 |
| III. | Agree Lease Deliverables | 01 Jul 2000 |
| IV. | Define Tenant Environment | 07 Jul 2000 |
| V. | Finalize Legal Documents | 10 Jul 2000 |
| VI. | Obtain Approvals and Execute Documents | 15 Jul 2000 |
| VII. | Complete Landlord Works | 15 Aug 2000 |
| VIII. | Complete Tenant Works | 30 Sep 2000 |
| IX. | Issue Best Practice Report | 07 Oct 2000 |

FIG. 18

Local Service Provider- Architect/Interior Designer
Request for Proposals
Scope of Services

Phase I: Space Programming and Adjacencies

XXX has prepared a one-page program summary. Architect will meet XXX to review this document and discuss adjacencies. Maximum cost not to exceed LC xxxxx

Phase II: Preliminary Plan and Building Survey

Architect will visit two buildings and receive preliminary CAD space plans for each. Architect will prepare "block plans" for XXX's review. Based upon XXX's feedback and comments, Architect will revise plans and make a preliminary fit of furniture using generic templates that approximate current and required furniture. Architect will review building systems and other base building specifications and, based upon XXX's needs, advise if any problems are anticipated.

Phase III: Preliminary Specification and Cost

Based on an agreed preliminary plan, Architect will prepare a 2 to 3 page summary of required works including partitions, carpeting, ceiling, electrical distribution and lighting requirements, and air-conditioning/ventilation needs (normal except for server room), along with preliminary quantities and cost. Architect will estimate the time to complete these works. Architect will not specify server or telephone systems.

Phase IV: Review of Landlord Proposal and Cost Estimates

Architect will meet with landlord to review their response to specifications and will prepare an estimated cost for work not included in landlord's "building standard" fitout.

Phase V: Preparation of Lease Documents

Architect will prepare detailed plans of works to be completed by landlord including partition, ceiling/lighting, electrical, and ventilation plans along with quantity measurements. Architect will provide a written specification of landlord's work including interior finishes. Architect will prepare a furniture plan based upon an inventory to be provided by XXX. Assume that all requirements for furniture shall be competitively bid to local vendors, and that Architect shall not accept compensation from any furniture vendors.

Phase VI: Project Monitoring and Coordination

Landlord will be responsible for a turnkey delivery of XXX's fitout requirements. Architect will inspect progress of works and report any difficulties. Architect will also coordinate schedule for delivery and installation of XXX's furniture, data cabling, telecomm, and security systems.

Phase VII: Handover of Premises

Prior to occupancy, Architect will accompany XXX on a final inspection of premises to accept the landlord works and/or agree on a defects list.

FIG. 19A

Phase VIII: Relocation Management

Architect will coordinate all aspects of the move into the new premises including moving schedules, and relocation (if any) of furniture, telephone and server systems. Architect will indicate if they do not provide this service.

FIG. 19B

METHOD AND APPARATUS FOR NEGOTIATING A REAL ESTATE LEASE USING A COMPUTER NETWORK

BACKGROUND OF THE INVENTION

1. Technical Field

This invention relates generally to electronic commerce and the Internet. More particularly, the invention provides a method and apparatus for allowing two parties to negotiate and execute a real estate lease over a computer network such as the Internet.

2. Related Information

Corporations frequently need to lease real estate in the form of offices, laboratories, warehouses, and other spaces. Alternatively, companies sometimes have surplus office space that could be sublet to tenants for profit or cost recovery.

Typically, companies will hire real estate brokers to search for and conduct preliminary negotiations regarding potential leasing arrangements. After preliminary details have been worked out, lawyers acting behalf of the prospective landlords and tenants negotiate a detailed lease agreement. This process may involve numerous meetings, telephone calls, faxes, exchanges of draft documents, and the like. It also may involve various middlemen in addition to lawyers and real estate brokers. For example, if architectural or mechanical improvements are needed, one or both of the parties may hire outside contractors (e.g., architects or engineers) to assist in evaluation of lease properties and/or to propose modifications to the property.

Because of human nature and the typically unstructured methods by which leases are negotiated, parties sometimes backtrack on previously agreed-upon provisions or demand changes to lease provisions that were previously believed to be the subject of agreement. Parties may spend a large amount of time negotiating details of lease provisions that later become moot (e.g., the leasehold improvements to the premises) because of disagreements over other provisions (e.g., term of the lease). Consequently, acquiring or leasing real estate in the corporate market incurs large costs and time because of intermediaries and human interaction required to negotiate lease provisions.

Various web-based listing services have sprung up in recent years to service the real estate needs of companies looking for space, including sales, leases, and auctions. Companies such as Loopnet, PropertyFirst, and EGPropertyLink provide brokerage and listing services in an attempt to facilitate real estate transactions over the Internet. These services primarily focus on listing properties, and do little to facilitate the negotiation or consummation of real estate deals. In particular, these services do not provide process management tools to guide landlords and tenants through a structured deal. Furthermore, they do not provide a mechanism for monitoring progress of a transaction after signature of the lease (e.g., completion of works by landlord and tenant), nor do they provide any mechanism to integrate into the process an evaluation of qualitative aspects of the transaction such as cross-border difficulties and delays, and the effectiveness of local service providers such as brokers and architects.

The negotiation of real estate leases between parties located in different countries involves additional inefficiencies and drawbacks. For example, because of different time zones, the times available for parties to meet or hold telephone conferences may be limited. Differences in currencies (e.g., dollars versus Euros) and metrics (e.g., square feet versus square meters) add complexity to the negotiation process, thus driving up costs. Language barriers may also add additional costs.

It may be difficult for a U.S.-based prospective tenant to hire outside contractors, such as architects, in another country. Furthermore, the procedures and customs used by foreign real estate brokers and intermediaries to negotiate a corporate lease may be different depending on the country, language, and regulations. Legal documents drafted in one country may look substantially different from those typically drafted under U.S. laws and customs. These and other differences have made it very costly to negotiate leases for commercial office space across international borders.

SUMMARY OF THE INVENTION

The present invention overcomes the aforementioned problems by providing a method and apparatus that facilitates a structured lease negotiation between two parties to a real estate transaction. According to one variation of the method, a series of predefined milestone negotiation steps are executed on a computer that couples two parties through a network, such as the Internet. Parties to the transaction answer predefined questions regarding a proposed transaction in such a manner that certain aspects of the transaction can be agreed upon early during the negotiation process while others are deferred to later phases. Additional steps of completing the lease transaction can also be included in the inventive method.

In one variation of the invention, the parties answer questions and exchange information without the simultaneous participation of each participant, such that a structured negotiation takes place over a period of time, possibly in different time zones. In each phase, parties must select from a predefined list of actions (e.g., agree or defer) associated with a particular aspect of the negotiation (e.g., rent to be charged, term of the lease, etc.). Provisions to which both parties agree are "locked in" while those that are deferred are worked out in a subsequent phase. Certain lease provisions may have subsidiary actions (e.g., lower-level agreements and deferrals) that can then be "rolled up" to the phase-level negotiation. Tools are provided to facilitate transnational aspects of the negotiation (e.g., conversion between currencies, metrics, or languages). A computer generates intermediate documents that assist in the negotiation (e.g., draft proposal letters) and identifies areas that require further negotiation.

If parties indicate that outside help is needed to define part of the contract (e.g., architect review of an office layout), a computer suggests vendors located in the geographic area of the lease property and transmits via e-mail a draft scope of services request to one or more vendors. Each party identifies corporate approvals required to complete the negotiation, and a computer-generated lease document can be printed for signatures. Feedback from the parties in the form of problems encountered and solutions achieved during the negotiation process are collected and stored in a database for review and use by other future negotiation parties.

Other features and advantages of the invention will become apparent with reference to the following detailed description and the figures.

BRIEF DESCRIPTION OF THE DRAWINGS

FIG. 16 shows a computer-generated lease proposal to be filled in by one or both of the parties.

FIGS. 17A and 17B show a computer-generated preview of a lease proposal to be agreed between the parties.

FIG. 18 shows a computer-generated schedule for each phase of a nine-phase lease negotiation and execution process.

FIGS. 19A and 19B show a computer-generated request for proposal for a local service provider.

DETAILED DESCRIPTION OF THE PREFERRED EMBODIMENTS

Figure 1A:
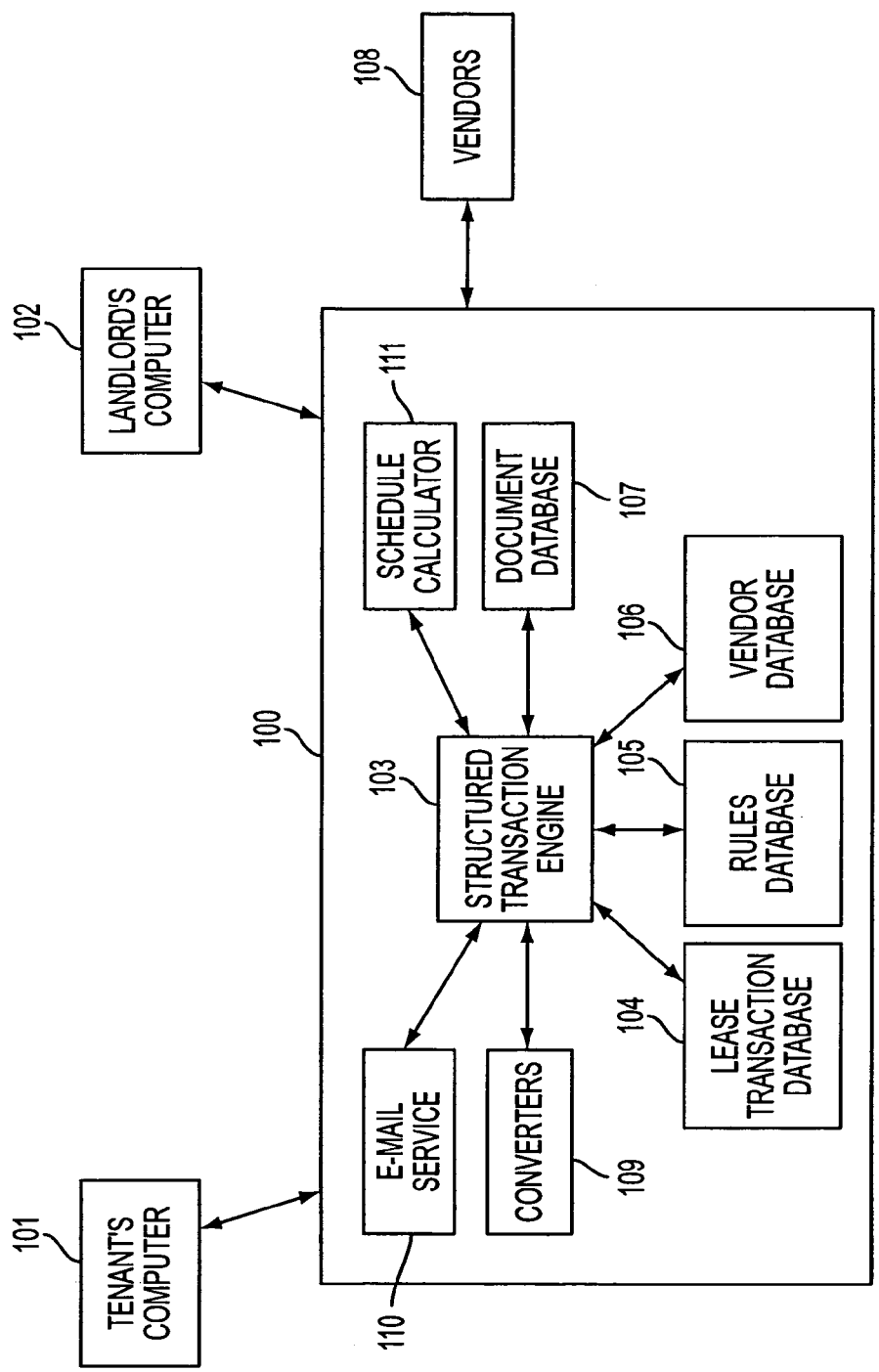
FIG. 1A shows a system for facilitating a real estate lease transaction between a prospective tenant and prospective landlord using a computer-driven structured negotiation technique.

FIG. 1A shows a system for facilitating a real estate lease transaction between a tenant and a landlord. Although the terms "landlord" and "tenant" will be used generally to refer to actual parties to a lease negotiation, those terms also encompass agents or others acting on behalf of the ultimate landlord or tenant. It is also possible that there will be more than one landlord or tenant to a transaction. It should also be understood that a tenant in one context could in fact act as a landlord in another context. For example, a tenant that needs to dispose of part of a leasehold interest could be considered a landlord in the context of the invention. A landlord having an existing lease with a tenant may act in concert with the tenant to sublet the property to another tenant; in that context, the landlord and original tenant could both be considered landlords while the prospective new lessee would be the tenant. In summary, the terms "landlord" and "tenant" may have a variety of meanings dictated by the particular context.

According to the system of FIG. 1A, a prospective tenant operates a computer 101 to negotiate a real estate lease with a prospective landlord, who operates a separate computer 102. The parties negotiate the lease through a computer 100 that implements a structured transaction. Computer 100 may comprise a web site that stores and generates web pages accessible over the Internet to both parties, each of whom may be located in different countries and time zones. Additionally, one or more vendor computers 108 may also communicate with computer 100 as described in more detail herein. Alternatively, the functions associated with computer 100 can be implemented in computer 101 or 102, or a combination of the two computers, such that no physical third computer is required.

According to one aspect of the invention, each lease is negotiated using a computer-implemented process that guides the parties through various negotiation phases. Although the invention will be described with reference to a nine-phase negotiation and execution process, the invention is not limited in this respect, and it will be appreciated that a different number of negotiation phases can be used without departing from the scope of the invention. Any or all of the steps described herein can be implemented in software and stored on computer-readable media for execution in a computer.

In one embodiment, a structured transaction engine 103 controls the negotiation process by displaying web pages containing predefined choices for various aspects of the transaction within each negotiation phase, and by comparing choices made by each party on each web page to rules stored in a rules database 105. Rules database 105 and engine 103 can comprise an expert system or other type of knowledge base that stores information concerning allowable inputs from each user for each phase. Alternatively, the logic used to control the operation of the negotiation (and to flag errors or conflicting information entered by users) can be incorporated into software using a procedural or object-oriented language.

Structured transaction engine 103 stores information entered by each party into a lease transaction database 104, which maintains information concerning each evolving lease negotiation. Multiple leases may simultaneously be under negotiation at any one time among different sets of negotiators, such that lease transaction database 104 contains information for different leases in various stages of negotiation. Vendor database 106 contains information concerning various third-party vendors (e.g., architects, engineers, lawyers, interior designers, and the like) and their associated contact information (e.g., city, country, e-mail address, telephone and fax number). Document database 107 contains certain standard document templates that can be used to construct a completed lease and other intermediate documents based on information provided by the parties during the negotiation process.

One or more converters 109 provide conversion functions (e.g., Euros to dollars, square feet to square meters, and vice versa) to facilitate the negotiation of particular aspects of each lease. An e-mail service 110 can also be included to allow parties to a negotiation to transmit and receive messages, including attachments such as draft documents, during the negotiation process. Schedule calculator 111 calculates a proposed schedule corresponding to milestones during the negotiation and execution phase, based on average actual lengths of time stored in a database. In one variation, the lengths of time stored in the database are based on or derived from previously negotiated contracts (i.e., real-world practice is used to project future schedules). For example, if over the course of five different negotiated leases the average amount of time needed to go from generating a draft lease to moving into the leased property is two months, the scheduler would use that value to schedule such a milestone two months before the lease move-in date.

In accordance with one aspect of the invention, the parties answer questions presented on web pages according to a computer-implemented transaction sequence, such that the parties can quickly identify areas of agreement and resolve areas of disagreement in an efficient manner. The lease negotiation can be conducted across great distances (e.g., across the Atlantic Ocean) and in different time zones through the use of a computer network such as the Internet. Because both parties are forced to conform to a highly structured, well-defined transaction sequence for negotiation, errors and misunderstandings can be greatly reduced. Moreover, computer software can be used to quickly identify areas of agreement and offer alternatives for resolving areas of disagreement.

Figure 1B:
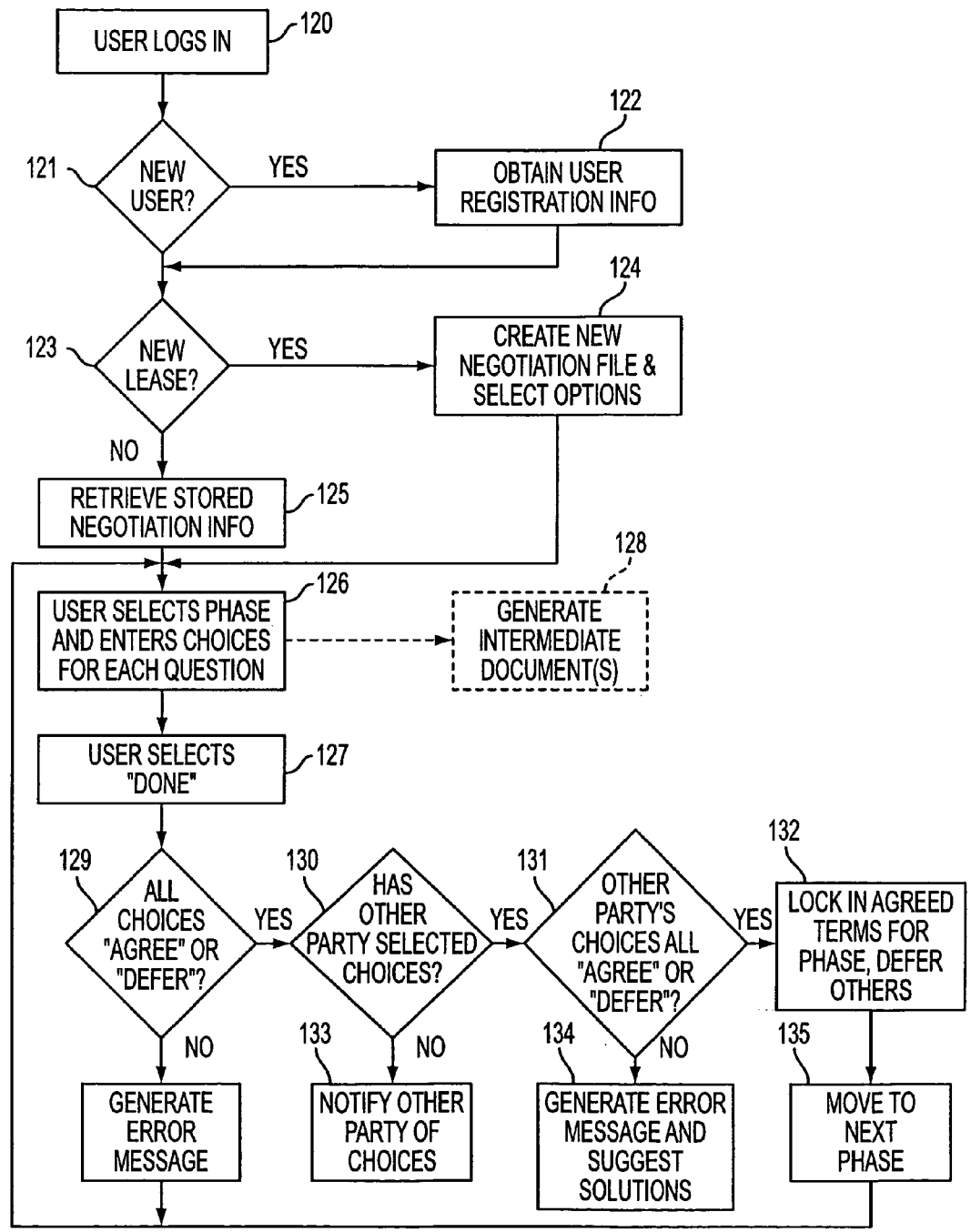
FIG. 1B shows a computer-implemented method for allowing two parties to negotiate a lease transaction using structured negotiation phases.

FIG. 1B shows a computer-implemented method for negotiating a lease transaction using structured negotiation phases. As shown generally in these figures, each party can independently log into a web-based transaction management system (e.g., computer 100 of FIG. 1A) and negotiate lease terms by selecting choices from transaction display screens. In one embodiment, parties are prevented from advancing to the next negotiation phase unless the computer detects that each user has either agreed to a specific lease term, or that each user has elected to defer agreement on a term until a later negotiation phase.

Each lease provision can be negotiated by taking one of several predefined actions. In one embodiment, at each top-level negotiation phase, a party must either AGREE or DEFER on each lease provision (e.g., by selecting a choice or clicking on an icon representing a choice). Each of these choices can in turn can result in or derive from lower-level actions by involving lower-level decisions. In other words, before a party is prepared to AGREE or DEFER on a lease provision, lower-level decisions involving steps of mediation, issuance of third-party requests for assistance, or other types of actions may need to be taken. These lower-level decisions can be reached using additional computer screens that are linked to one or more of the higher-level screens.

More generally, the negotiation, execution and evaluation of a lease can be accomplished according to one aspect of the inventive principles using a reduced instruction protocol that facilitates and accelerates milestone decisions associated with the transaction. Such a protocol provides numerous benefits because, among other things:

(a) The lease transaction process is complex and can involve numerous participants and, in a cross-border context, these participants will most likely reside in different countries;
(b) There are varying degrees on skill among the representatives of the landlord and tenant and, in a cross-border context, varying levels of understanding of their respective roles and responsibilities;
(c) In a cross-border context, there are language problems, local knowledge gaps and cultural differences that can slow down negotiations;
(d) In a cross-border context, a computer application for this process functions best when it prescribes a clear set of top-level decisions (milestones) with a mechanism for coordinating the roles and actions of those who participate in reaching these decisions.

One embodiment of the protocol includes the following three elements, although other embodiments incorporate fewer than all three elements:

1. Decision Protocol

The parties must either agree or defer to all milestone decisions. This acknowledges that milestones are critical to completing the project, and that it is important to avoid the dead-end implied by using the word "no" (which is considered impolite or is non-existent in some cultures). The computer provides a facility for either agreeing or deferring on each milestone decision. In addition, displayed with each milestone decision is a dialogue box to enter a comment, or an icon to indicate that a comment has been entered and will be visible on another screen. Predefined actions in this category include:

Agree: a party acknowledges that a milestone decision has been reached (e.g., agreement on a specific monthly rent).

Defer: a party agrees to defer a milestone decision to a later date (e.g., defer a decision on the condition of the premises).

2. Resolution Protocol

Assuming that all milestone decisions must be agreed to complete the process, an additional mechanism can be used to convert deferrals into agreements. Therefore, the protocol provides three resolution mechanisms, including: (a) a user forum; (b) use of a Local Service Provider (LSP); or (c) mediation. The computer facilitates selection of LSP's or mediators (via menus of service providers, issuing scopes of services, etc.), and schedules meetings among the participants in these decisions. Three corresponding predefined actions in the resolution protocol category include:

Forum: the transaction parties (i.e., the landlord and tenant) meet in a structured environment (e.g., scheduled by computer) to agree on a milestone decision.

LSP: the parties agree to select a third party local service provider or providers (e.g., an architect) to facilitate reaching a milestone decision.

Mediate: the parties agree to select a neutral expert to facilitate reaching a milestone decision.

3. Action Protocol

The computer prescribes a sequence of milestone decisions to complete the process. For some milestones, additional work must be done to reach an agreement or deferral. The protocol streamlines this work into a prescribed set of actions that are required of the participants (i.e., the landlord, tenant, and LSPs), and which can be undertaken with computer assistance. The computer acts as an engine to provide adequate information and resources on the desktop of the landlord and tenant. Examples include distributing documents such as draft leases; issuing standardized documents such as Requests For Proposals (RFPs), specification of leasehold improvements, etc; notifying parties if any schedule dates have been missed or any input errors have occurred; and scheduling meetings among the participants.

In addition, the computer can prompt the participants about certain elements in the process. Examples include prompting the parties to identify resource persons; prompting the parties to negotiate certain aspects of tenant's physical environment; and prompting the parties to obtain signatures to certain documents.

It is anticipated that the computer can provide additional assistance in the more restricted roles by suggesting various courses of action. For example, if the parties had not resolved the delivery of the tenant's space on a "turnkey" basis, the computer could suggest that the parties agree to split the cost of the improvements above the landlord's "building standard" on a 50/50 basis. More generally, the computer can draw upon a library of potential solutions based on past practice to suggest resolution to certain milestone decisions or sub decisions. This facility could be visually displayed alongside any required future action. Examples of predefined actions in this action category include:

Identify: the computer prompts the parties to locate an appropriate internal resource person or entity. For example, prompt to identify authorized signatory for lease.

Issue: the computer issues a standardized document to the parties or to LSPs. For example, the computer can issue a request for proposals to one or more architects.

Notify: the computer sends a notice to the parties and/or LSPs if actions are erroneous or milestones are not completed by the scheduled dates. For example, the computer can notify the parties that a scheduled date for signature of lease has been missed.

Obtain: the computer prompts the parties to generate information from internal resources. For example, the computer can prompt the parties to obtain approvals for lease.

Provide: the computer prompts the parties as to generally submit information in support of a milestone decision. For example, the computer can prompt a party to submit a preliminary cost estimate for leasehold improvements.

Require: the computer can ask the parties whether they require standardized documents to assist in reaching milestone decisions. For example, the computer can ask the parties whether they require a broker RFP.

Receive: the computer receives and subsequently transmits in a summary form documents from third parties. For example, the computer can receive and transmit a response to a broker RFP.

Resolve: the computer prompts the parties or an LSP to reach agreement on detailed matters related to third party documents. For example, the computer can prompt parties to resolve outstanding provisions of lease agreement.

Schedule: the computer arranges meetings in a format chosen by parties and/or LSPs. For example, the computer can schedule a user forum to agree on outstanding lease issues.

Send: the computer transmits documents to parties. For example, the computer can transmit a draft lease to one of the parties or LSPs.

Select: the computer prompts the parties to make choices among alternatives provided on a screen or box. For example, a computer can prompt a party to select a mode for a user forum.

It will be appreciated that the above examples of pre-defined actions are exemplary only; different labels or actions can be specified, and each action can be selected using a pictographic icon or other means to facilitate communication across languages (e.g., a handshake icon to signify agreement on a lease provision).

In addition to selecting a pre-defined response such as one selected from the above choices, each party may also in certain circumstances enter ancillary information that is associated with and stored with the response. For example, if one party suggests a delivery date of October 1 for a leased property (and indicates AGREE for that date), the other party may instead suggest a delivery date of November 1 for the property. If both parties have selected AGREE but have entered different values, the computer would flag the discrepancy and possibly suggest a solution (e.g., split the difference). Alternatively, a single text entry box could be provided, and each party could override the other's entry, with the computer flagging any overridden value (and, in one embodiment, changing the first party's AGREE choice back to a default value or some other choice).

If both parties select the same response (e.g., one of the responses selected from the above list), then the agreed status of the particular lease term is deemed to be "locked in" and not subject to further negotiation. This is intended to facilitate the negotiation status by preventing parties from "back-tracking" to items that were previously the subject of agreement. However, the invention is not limited in this respect, and certain variations of the invention include allowing users to change previously matched responses.

Beginning in step 120 of FIG. 1B, the parties independently log into the system (e.g., using a user name and password). A user can include a party to the negotiation (e.g., a landlord or tenant), although it could also include agents or others acting on behalf of principals to the negotiation. In step 121, if a user is not recognized, then in step 122, user registration information (e.g., name, address, e-mail address, and the like) is obtained. In step 123, a check is made to determine whether the user seeks to negotiate a new lease or continue negotiating a previously started lease.

If a new lease is selected, then in step 124 a new negotiation file is established, and each user can select options such as the currency to use for displaying negotiation information and metrics (e.g., square feet or square meters). In one variation, a prospective tenant and landlord can choose to view the information in different formats, such that the tenant views the rent in dollars and the landlord views the rent in Euros, for example. Currency and metrics converters (function 109 in FIG. 1A) are used to automatically convert between units entered by the users based on currency exchange rates. In another variation, values are shown simultaneously in two formats (e.g., square meters and square feet), and the parties can select what formats are to be displayed (e.g., dollars and Euros simultaneously, or dollars and French francs simultaneously). It is assumed that currency exchange information is stored in a database or accessible over a network such as the Internet.

If negotiations regarding a previously started lease are to be resumed, then in step 125 computer 100 retrieves previously stored negotiation information from database 104. In step 126, each user (i.e., each tenant and landlord) selects a negotiation phase and enters choices for decisions to be reached during each phase. According to the invention, each party can log on independently and at different times to negotiate the lease, so that it is not necessary to have simultaneous participation by the parties. Of course, it is possible that the parties might log in at overlapping times, and in such a case the system can prevent both users from modifying the same data at the same time (e.g., using file or database locks, for example).

Step 126 can involve subsidiary steps of negotiating particular aspects of a lease provision before agreement or deferral on the provision is reached. For example, before a party is prepared to agree to a lease provision defining the condition of the premises, several sub-decisions may be involved, such as determining what types of electrical systems will be provided, what type of security system is included, etc. These provisions can be negotiated using lower-level computer screens that invite the user to make selections based on pre-defined choices. In one embodiment, the computer indicates to the user that sub-decisions are involved, and prompts the parties to ensure that such sub-decisions are addressed. Alternatively, if the tenant has for example agreed to take the premises in "as-is" condition, these lower-level decisions will be unnecessary, and the computer can avoid prompting the tenant for these choices.

If in step 127 a user specifies that he or she is done entering information, then processing advances to step 129. At various points during the process, each user may optionally choose to generate one or more intermediate documents (e.g., a draft lease proposal or the like) depending on the negotiation phase in which the user is participating (see step 128). Further details of this optional step are provided below.

In step 129 the computer checks to determine whether all of the choices selected by the user in the negotiation phase are either AGREE or DEFER. If so, then in step 130 another check is made to determine whether the other party has also selected choices for the particular negotiation phase. If not, then in step 133 an e-mail message or other notification is transmitted to the other party inviting that party to review the responses provided by the first user. If further explanation is required, the computer can provide a summary of the phase with some frequently asked questions. Additionally, the computer can provide a comment or dialog box for each phase to facilitate direct communication between the parties. Processing then either terminates or returns to a previous step (e.g., step 125 of FIG. 1B).

If in step 130 the other party to the negotiation has also selected choices for the particular negotiation phase, then in step 131 a check is made to determine whether all of the choices specified by the other party are either AGREE or DEFER. If not, then in step 134 an error message is generated and solutions are suggested. For example, if one party has selected AGREE for a particular lease provision but the other party has selected DEFER, the computer can suggest that the agreeing party DEFER the decision until the next negotiation phase. As another example, if one party has agreed to $5,000 per month rent but the other party has agreed to $6,000 per month rent, the computer can flag the discrepancy and suggest a compromise rent of $5,500 per month.

Alternatively, a single text box can be provided for entering a value such as rent, thus allowing each party to override the other's value. In one variation, the computer would then change the choice of the party whose value was overridden from AGREE to undecided or some other choice and generate a message indicating that the first party had changed the value. In yet another embodiment, if the two parties had agreed on different amounts, the computer would change both AGREE choices to DEFER, such that the decision would be deferred to a later negotiation phase.

If in step 131 both parties have selected either AGREE or DEFER for all lease terms pertaining to the particular negotiation phase, then in step 132 the agreed terms are deemed "locked in" by the computer and not subject to further change; all those for which the parties have indicated DEFER are deferred by the computer until a later negotiation phase. Thereafter, in step 135 the user is permitted to advance to the next negotiation phase (e.g., one of the nine negotiation phases shown in FIG. 2). The previous steps beginning at step 126 are then repeated for each phase until the negotiation has been concluded.

Assuming in step 129 that the user did not choose either AGREE or DEFER for each item in the negotiation phase, then an error message is generated, and processing returns to step 126. It will be appreciated that options other than AGREE or DEFER can be provided without departing from the scope of the invention. Moreover, graphical icons (e.g., a handshake symbol instead of an AGREE choice) can be used. Choices can also be shown in different languages to the different parties, such that one party to the transaction sees choices in English while the other party to the negotiation sees the same choices in Spanish, for example.

Figure 2:
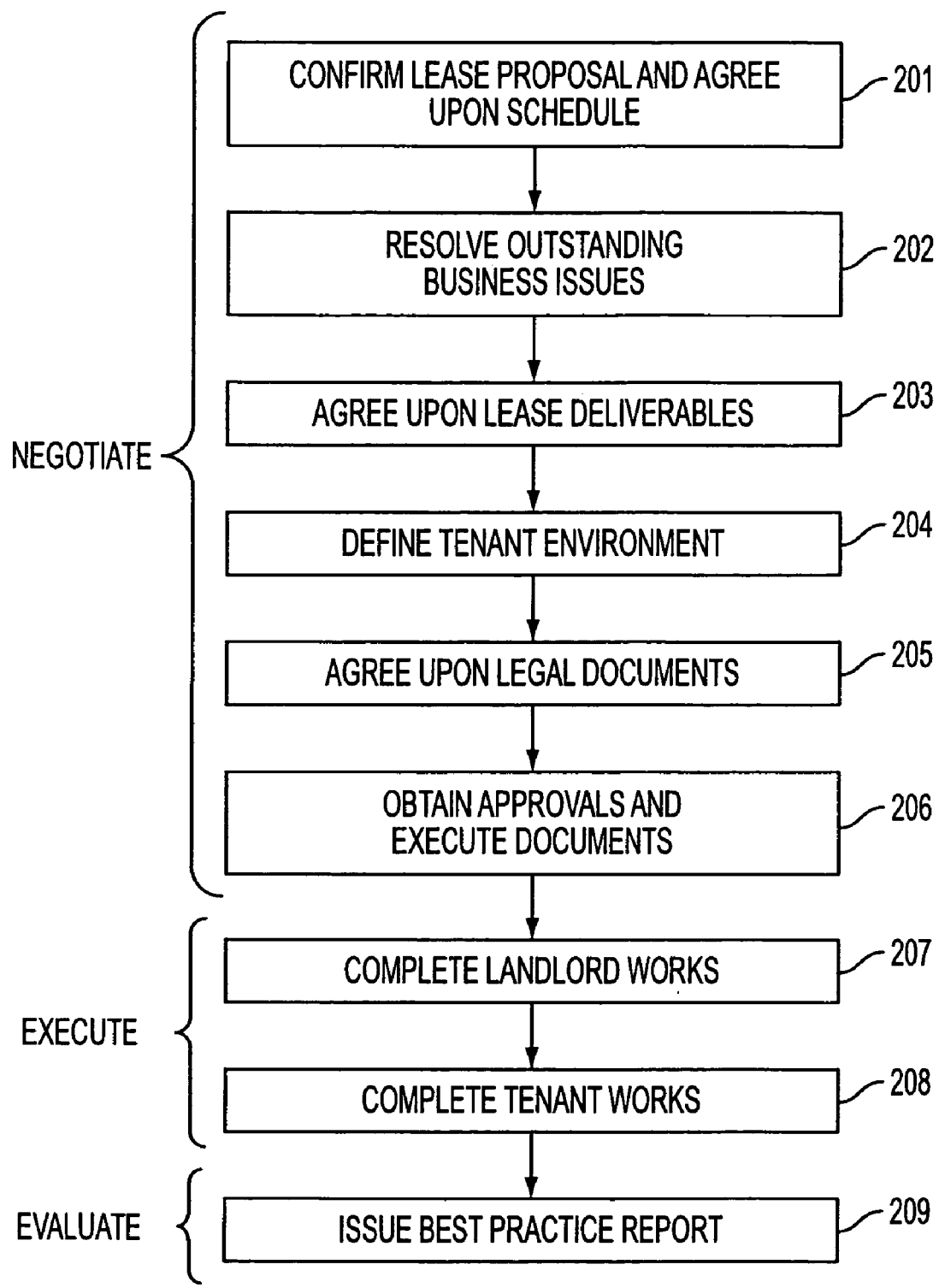
FIG. 2 shows a nine-phase computer-assisted process for negotiating and executing a lease transaction between a tenant and a landlord.

FIG. 2 shows a generalized nine phase computer-assisted process for negotiating, executing, and evaluating a lease transaction according to one variation of the invention. As explained above, in one embodiment each party is required to select agreement or deferral of certain lease provisions before the computer will allow the users to advance to the next negotiation phase. Selection of other choices for lease provisions within a negotiation phase may require ancillary communication (e.g., transmission of requests for services) or processing (e.g., submission of information). Web-based computer forms, such as those shown in FIGS. 13 through 15, can be used to select choices relating to lease provisions. Certain phases (e.g., 201 through 206) generally relate to the negotiation of a lease; other phases (e.g., 207 and 208) relate to execution of the lease, and a final phase (209) relates to evaluation of the completed lease transaction.

As shown in FIG. 2, a first phase 201 includes steps of confirming a lease proposal and obtaining agreement upon a lease schedule (e.g., delivery date). This phase is preferably conducted through the use of web-based computer display forms having appropriate selection means (e.g., radio buttons, check boxes, text boxes, pull-down menus and the like) that allow each user to enter and view information for the particular phase. Further details of one possible embodiment are provided below.

A second phase 202 includes steps of resolving outstanding business issues, wherein users are presented with a checklist of outstanding issues deferred from the first phase and prompted to develop solutions to these issues. A third phase 203 includes steps of obtaining agreement on lease deliverables (e.g., condition of the premises, furnishings, telecommunication systems, etc.). A fourth phase 204 relates to defining the tenant environment (e.g., preliminary floor plans, furniture, etc.). In this phase, the tenant defines his or her requirements to occupy the premises, including improvements and investments not provided by the landlord (which are typically included in the third phase). In the fourth phase, the landlord may or may not be involved in decisions regarding specification of furniture, network, and telecommunication systems, for example.

A fifth phase 205 relates to agreement on legal documents, including a step of generating a draft contract. A sixth phase 206 relates to obtaining approvals and execution of the lease documents, including steps of submitting forms for corporate approvals, paying deposits, etc. A seventh phase 207 relates to completing landlord works (e.g., landlord delivers landlord-supplied network system and leasehold improvements). An eighth phase 208 (completion of tenant works) includes steps such as delivering tenant-supplied furniture and telecommunications systems. This may include the use of contractors such as architects and engineers, and may or may not involve the landlord.

In the seventh and eighth phases, it is generally contemplated that the computer will perform a monitoring function of the scheduled dates for delivery of works as anticipated in the schedule, with a communication function in the event that scheduled dates are missed and a function to issue a standardized form for acceptance of works performed by the landlord and/or LSPs. Turning briefly to FIG. 18, a computer-generated schedule incorporating the major milestone phases is shown. In one embodiment, the computer generates such a schedule by using the lease move-in date as a starting point and "backing out" dates for earlier milestones using either default values or values retrieved from a database based on historically experienced lease transactions. As each date is reached, the computer can prompt the parties to agree that a particular phase has been completed, and can transmit a message to each party warning of upcoming delays if the phase is not completed. Although most milestones can be assumed to have a linear dependency (e.g., legal documents cannot be finalized until the lease proposal is agreed), it is also possible that certain milestone decisions can be deferred until later phases, such that a schedule slip in one milestone does not necessarily result in slippage for all remaining milestone decisions.

A final ninth phase (issue best practice report) includes steps of evaluating local service providers and preparing a best practice report, which is preferably stored in a database for future reference.

The following description, in conjunction with FIGS. 3 through 11 (details of each negotiation phase) and FIGS. 12 through 15 (computer-implemented forms that solicit information for each phase), explains one possible approach for implementing a method and system according to the present invention. It will be assumed that prior to performing the steps shown in FIG. 3, a user has logged into the system and, if pertinent, reviewed e-mail messages in his/her account that were received from other users, such as another party to the negotiation. It will also be assumed that a web-based computer display system using well-known hyperlink technology is used to solicit and display information between parties, although the invention is not limited in this respect.

Figure 12:
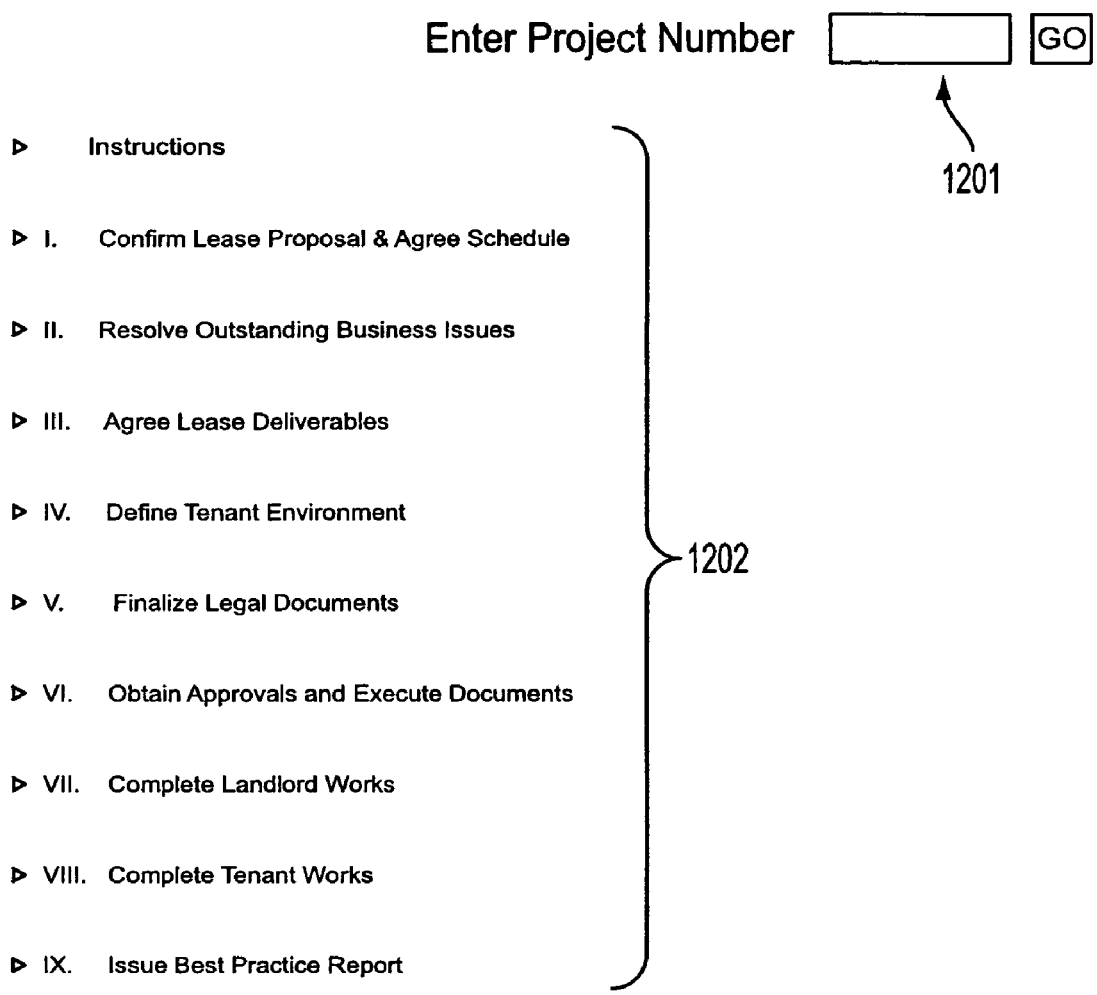
FIG. 12 shows a web-based computer screen presenting top-level choices for each phase of a nine-phase negotiation and execution process.

Turning first to FIG. 12, a top-level project negotiation phase selection page is presented to the user after the user logs in and identifies himself or herself. If a user is beginning a new negotiation, then a separate computer screen (not shown) is displayed to solicit information concerning the parties and the subject of the negotiation. Otherwise, if a previous negotiation has already been started, the user can enter the project number or name into a text box 1201 and the system will retrieve previously stored information regarding the lease. A top-level selection list 1202 contains hyperlinks to web pages corresponding to each of the nine negotiation phases identified on FIG. 12 (and also identified in FIG. 2) and would highlight the current phase that is in negotiation. As an alternative to the hyperlinked display screens described below, each party can fill out a "short form" lease proposal of a type shown in FIG. 16, and the computer can identify any differences between the choices selected by the two parties and focus on those areas of disagreement.

Although the user can jump directly to any negotiation phase, it is contemplated that each user will progress sequentially through the phases, and that users will be prevented from jumping ahead to later phases until agreement has been reached on lease provisions in each phase. Assuming that the user has not previously negotiated any of the lease provisions, the user would click on the first phase (Confirm Lease Proposal and Agree Schedule), which would cause the computer to display a screen such as the one shown in FIG. 13.

Figure 3:
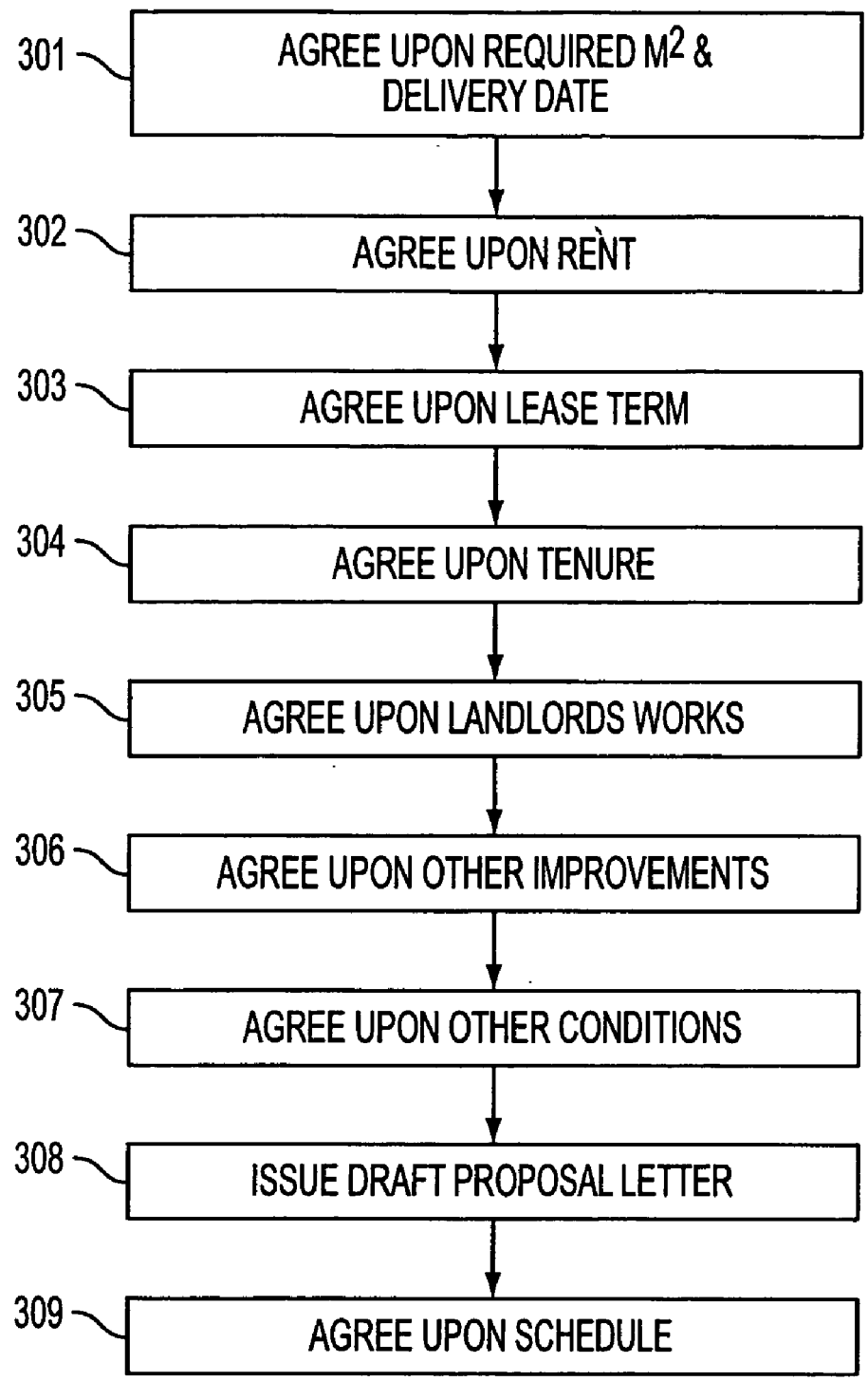
FIG. 3 shows additional details of the first phase.
Figure 13:
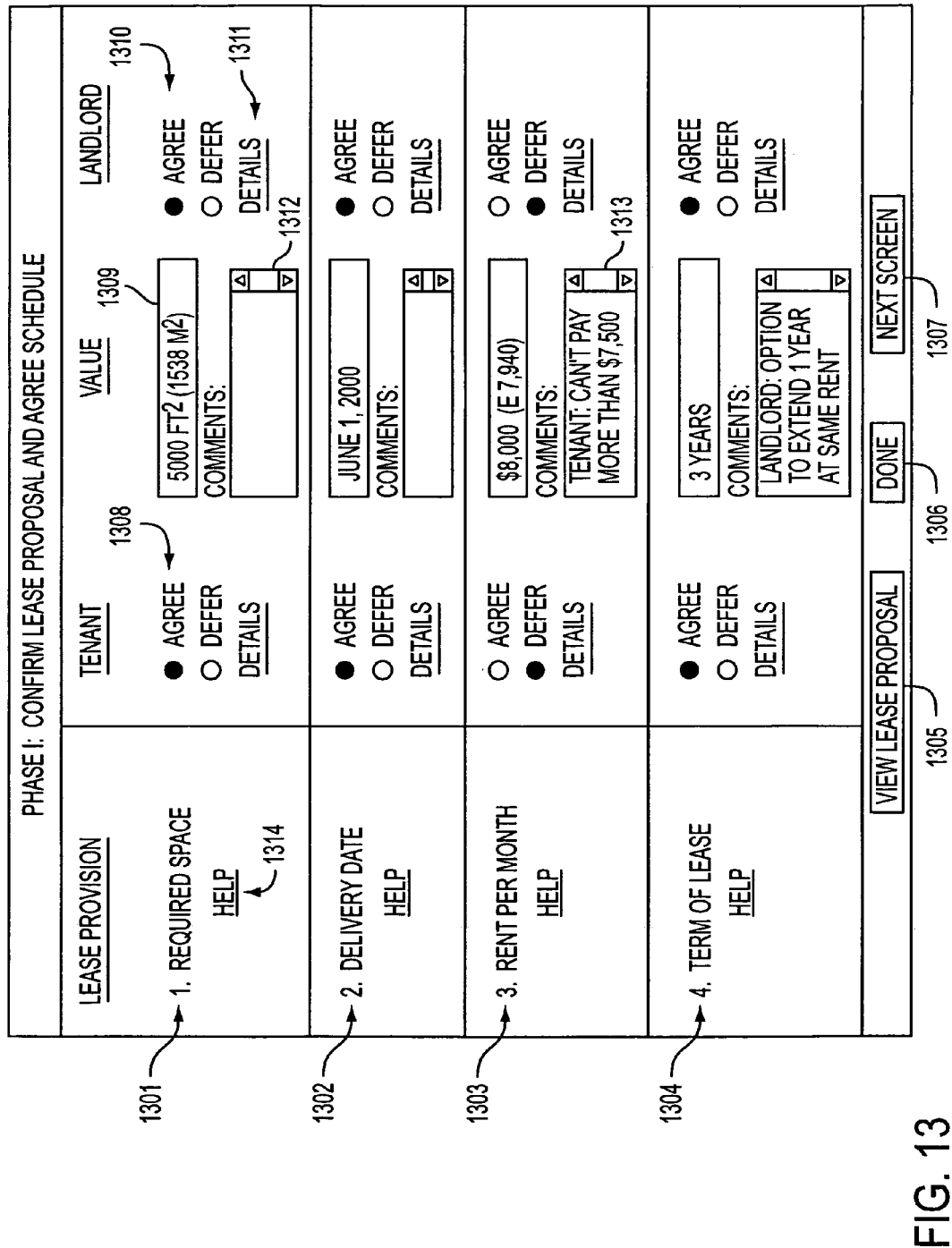
FIG. 13 shows a web-based computer screen in which a prospective tenant and landlord select predefined choices for lease provisions in a first phase.

FIG. 13 shows a web-based computer screen in which a tenant and landlord select predefined choices for lease provisions according to a first negotiation phase. This figure will be explained with reference to FIG. 3, which shows computer-implemented steps that can be used to negotiate between parties during a first phase of a lease negotiation. The steps need not be executed in sequential order as illustrated in FIG. 3. For the sake of simplicity, only four lease provisions are shown in FIG. 13 even though FIG. 3 shows 9 separate provisions. It should be understood that the illustrated lease provisions are by no means exhaustive or exclusive.

In general, for each negotiation phase the parties are presented with a set of provisions related to the lease or leased premises, and a set of choices (e.g., AGREE or DEFER) for taking action on each provision. For certain lease provisions, the parties must not only indicate agreement, but must agree on a specific value or values (e.g., the amount of rent to be charged). In some cases, agreement cannot be reached without negotiating lower-level details. In those cases, the computer-implemented method permits the parties to jump to the lower-level decisionmaking process before committing to an AGREE or DEFER at the higher level of the negotiation phase. Where a lease provision is deferred, the provision can be negotiated during a later phase by selecting choices other than AGREE or DEFER (e.g., resolution protocol actions such as user forum, LSP, or mediation).

As shown in steps 301 through 309 of FIG. 3, each party is asked to agree upon certain lease provisions (and, where appropriate, to specify certain information such as rental price). Although these steps are shown as sequential in FIG. 3, each user could of course select the choices and enter information in an order different from that shown. In one embodiment, however, a user is prevented from advancing to the next phase of negotiation until all provisions are either agreed to by both parties or any areas of disagreement are indicated as being deferred.

As shown in FIG. 13, four different lease provisions 1301 through 1304 are arranged on the left side of the computer screen. A HELP linkage 1314 can be provided for each lease provision to explain common lease provisions and to answer frequently asked questions. The right side of the screen in FIG. 13 is divided into a tenant portion, a landlord portion, and a middle portion in which either party can enter information. In general, it is anticipated that when the tenant logs into the system, the tenant will only be able to select or modify choices listed under TENANT and values in the middle portion of the screen. Conversely, the landlord can only select or modify choices listed under LANDLORD and the values in the middle portion of the screen. Each party specifies one or more values in the middle portion of the screen, optionally indicates comments in one or more comment boxes 1312, and clicks a DONE button 1306 to signify that they have completed their responses for each negotiation phase.

In general, each tenant and landlord must select either AGREE or DEFER for each lease provision. Before selecting a choice for a particular lease provision, the party can "drill down" to a lower-level decisionmaking process by clicking on an associated DETAILS hyperlink 1311, which would bring up a page such as that shown in FIG. 14. Suppose, as shown in FIG. 13, that both parties have agreed to a required space provision of 5000 square feet (automatically converted into square meters by the computer); a delivery date of Jun. 1, 2000; and a lease term of 3 years. Suppose further that the parties have agreed to defer agreement on the amount of rent (although a proposed rent amount is listed, and the tenant has added a comment to comment box 1313). As to the landlord's works (not explicitly shown in FIG. 13), the parties do not have enough information to agree or defer to the next step. In that case, one or both of the parties could click on the associated DETAILS link, which would bring up the screen shown in FIG. 14.

Figure 14:
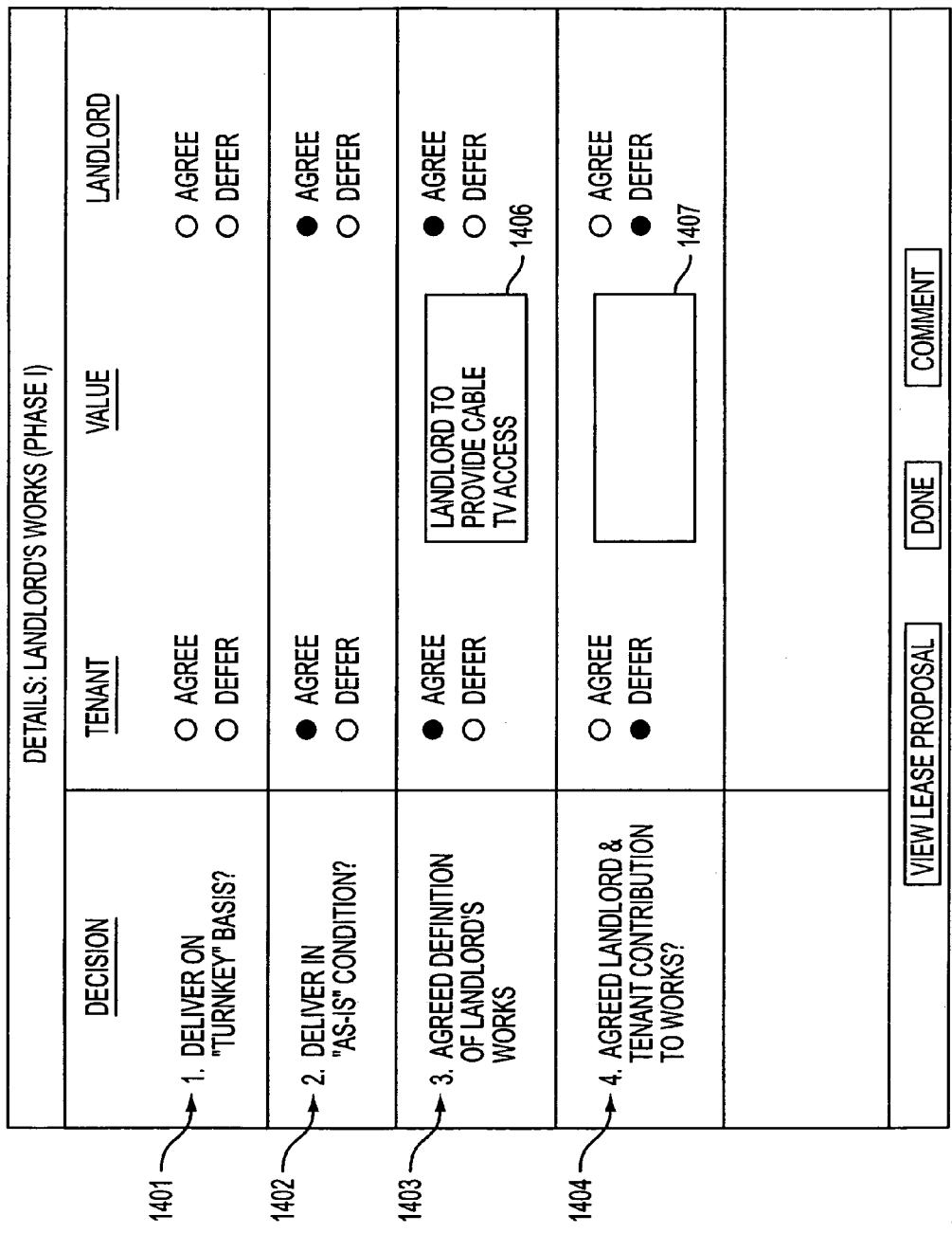
FIG. 14 shows a web-based computer screen for negotiating details of one lease provision.

Turning to FIG. 14, the parties are presented with a set of lower-level decisions concerning the landlord's works lease provision. As shown in FIG. 14, agreement on a landlord's works includes deciding whether the premises are to be delivered on a "turnkey" basis 1401; "as-is" condition 1402; a definition of the landlord's works 1403; and agreement on the landlord's and tenant's contribution to the work 1404. A help button (not shown) can be included to explain the decision and provide a reference to local market practice in a particular city.

Some of these sub-provisions require nothing more than an AGREE or DEFER decision (e.g., 1401 and 1402), while others (e.g., 1403 and 1404) require that a value be provided by one or the other party (e.g., elements 1406 and 1407). Each party can select choices as shown in FIG. 14 before selecting DONE and returning to the top-level lease provision screen shown in FIG. 13.

During the negotiation phases, either party can choose to view a draft lease proposal by clicking on VIEW LEASE PROPOSAL button 1305. In response, the computer generates a draft lease proposal incorporating the lease provisions that had so far been agreed to by the parties. One example of this is shown in FIGS. 17A and 17B. As a practical matter, after the lease has been negotiated (e.g., step 206 of FIG. 2), the lease proposal would be superseded by the actual lease.

As shown by the steps in FIG. 3, additional lease provisions including lease term, tenure, landlord works (e.g., "as is" condition or "turnkey" basis), other improvements, other conditions (e.g., parking, operating expenses, termination condition, etc.), and draft schedule can also be agreed to, deferred, or negotiated using the above-described process.

Assuming that both parties have selected either AGREE or DEFER for each lease provision and click DONE, the computer will advance to the next negotiation phase, which will now be explained with reference to FIG. 15. If the parties have not selected either AGREE or DEFER for all lease provisions in the first negotiation phase, then in one variant of the invention they will be prevented from advancing to a later negotiation phase. In certain variations of the invention, however, the parties are allowed to defer lease provisions such as the condition of the premises until successively later phases; at each later phase, the parties are prompted to resolve any outstanding issues.

Figure 4:
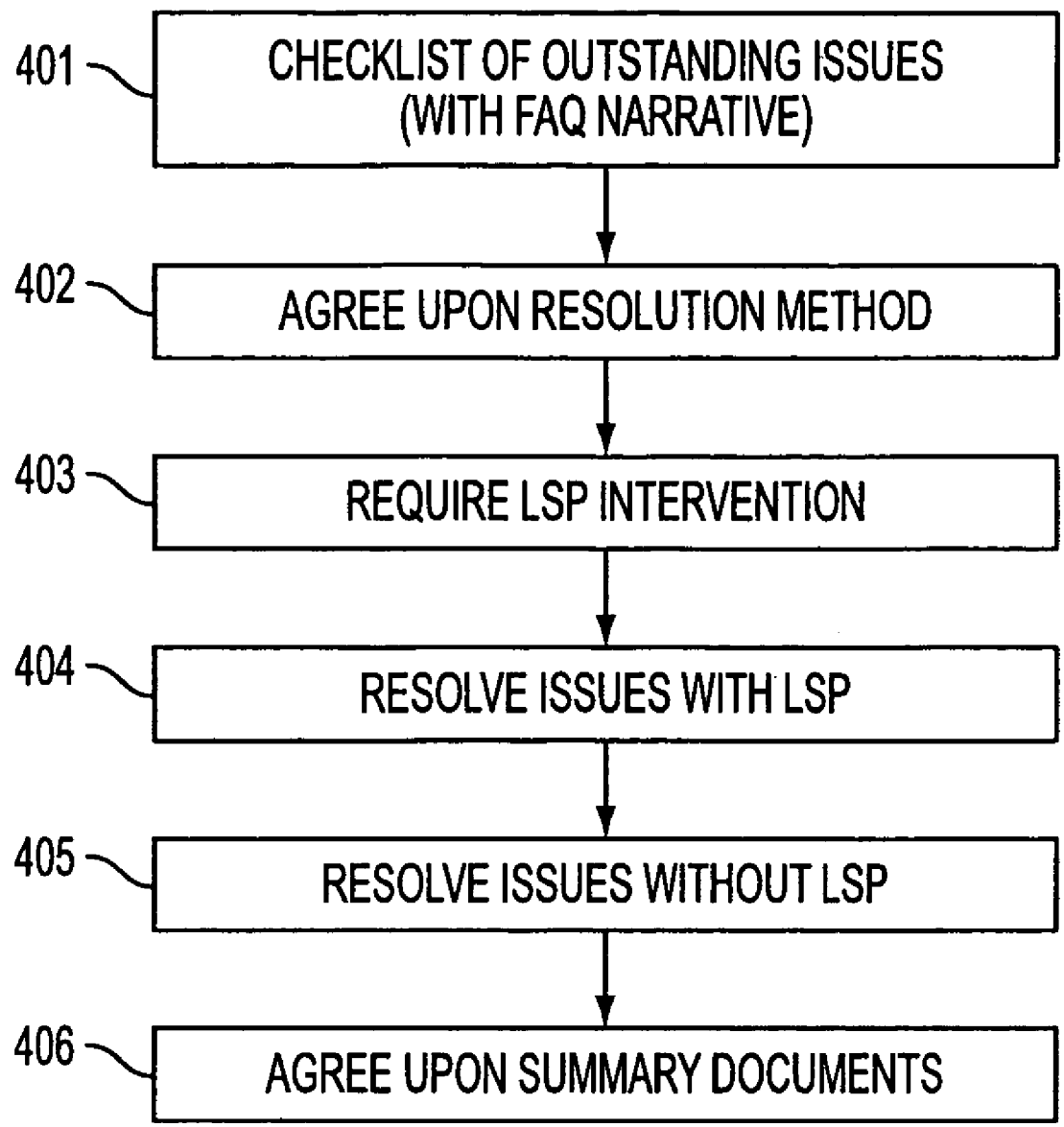
FIG. 4 shows additional details of the second phase.
Figure 15:
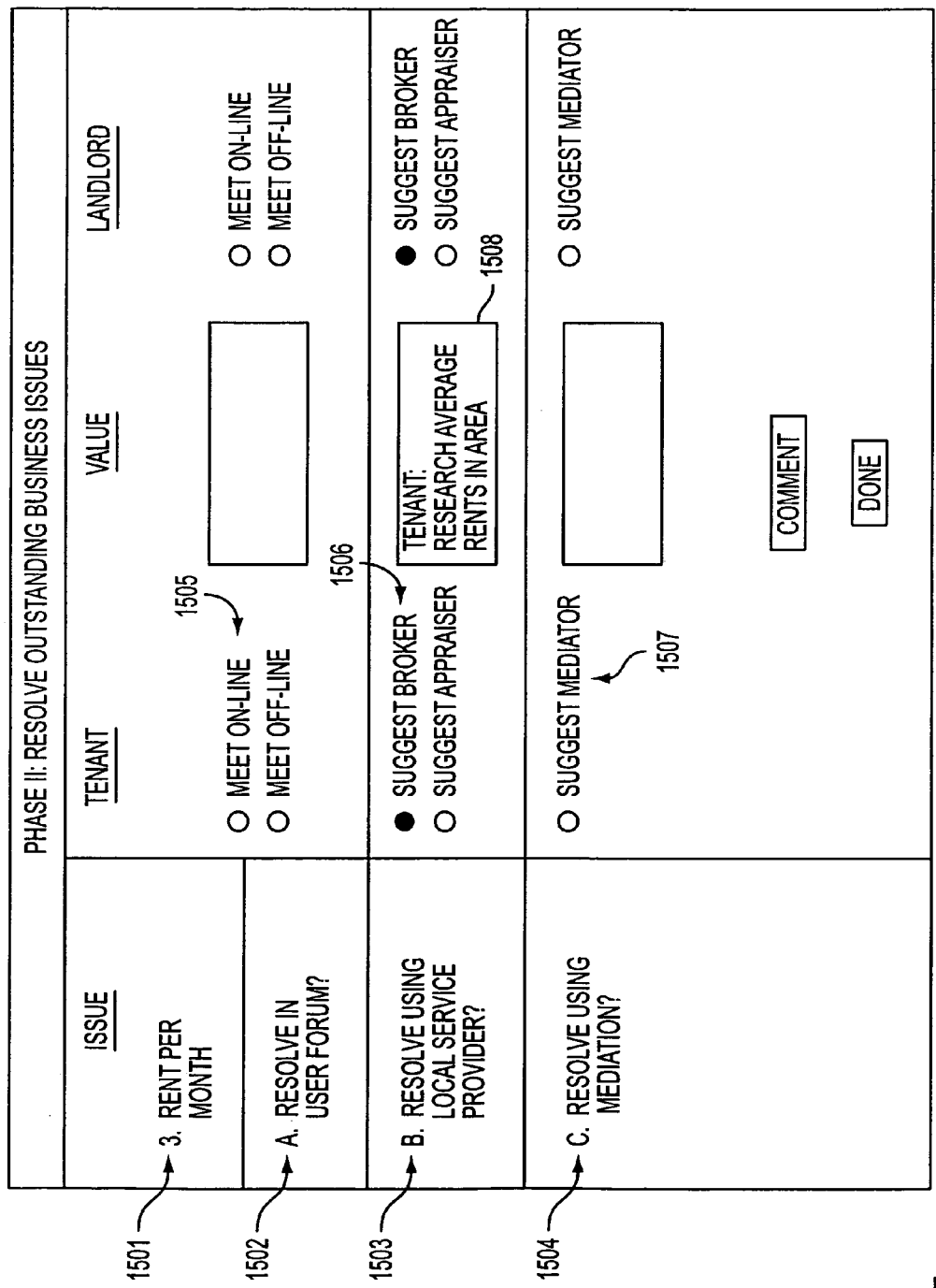
FIG. 15 shows a web-based computer screen in which a prospective tenant and landlord select predefined choices for resolving deferred lease provisions in a second phase.

FIG. 15 shows a computer screen with choices for a second negotiation phase. As shown in FIG. 4, in one variation of the invention the second phase includes steps of presenting a checklist of outstanding issues that were deferred from the first phase, and soliciting inputs from the parties that will allow the parties to reach agreement on the deferred issues using, for example, a local service provider (LSP) or mediator. Because the amount of the rent was deferred from phase one (see FIG. 13, lease provision 1303), this lease provision is again presented to the parties (item 1501 in FIG. 15) with options for resolving the issue. In one variation of the invention, an issue can be resolved directly by the parties, or by involving a third party. The parties may choose for example to resolve the rent issue in a user forum 1502, such as an on-line or off-line meeting (choices 1505). If both parties agreed to such a resolution, the computer would assist in arranging an on-line or off-line meeting (e.g., by asking the parties for available times; accounting for time zone differences, etc). The computer could arrange a chatroom dialog in an on-line forum or a conference call using a computer-aided program and may include a link through another web site.

Alternatively, the parties may choose to resolve the issue using a local service provider 1503. Two examples of local service providers relevant to the issue of rent might be a real estate broker in the area of the leased property or an appraiser. As indicated in FIG. 15, the parties may agree to hire a broker (choice 1506), and the computer could suggest a broker in the geographic area of the leased property. The parties may further choose whether to hire a separate broker, or to jointly hire a broker to advise both parties as to local practice (not explicitly shown). As indicated in comment box 1508, the tenant has suggested that the broker should research average rents in the leased area to help resolve the issue (see below).

As yet a third option, the parties may agree to resolve the issue through the use of a mediator 1507. In that case, the computer can again suggest one or more mediators familiar with the type of lease transaction and convenient to one or both of the parties. Additional computer screens (not shown) can be presented to the user to obtain information necessary to consummate the third party relationship. The computer would issue a request for proposals for the required assistance.

The negotiation options presented by the computer can be tailored to the specific lease provision that is the subject of dispute. For example, if the parties are stuck on the subject of the condition of the leased property (e.g., the type of network communication system that will be provided), the computer would suggest a service provider familiar with telecommunication systems, such as an engineering consultant or a company that specializes in providing networks. As another example, if the parties have not reached agreement on a floor plan, the parties could enlist the services of an architect or interior designer, again with computer-generated requests for proposals with the required scope of services (see, e.g., FIGS. 19A and 19B).

If the parties agree that a local service provider is to be hired, the computer system can recommend one or more providers based on the geographic area of the lease (see FIG. 1, vendor database 106). Alternatively, a party may individually choose to hire a local service provider without the assent of the other party (e.g., an architect), and the system can recommend one or more service providers in the same manner. In one embodiment, the system generates a preformatted request for services using information obtained during the negotiations (e.g., name/address of the tenant, information concerning the leased space, etc.) and transmits the request to one or more vendors in order to receive a quote for services. The request can be transmitted via e-mail or fax by the computer system, and each vendor can submit a bid or response to the party or parties requesting the services. The computer can receive responses in a standardized format and transmit to the parties a comparison of the proposals if more than one vendor were selected. In one variation, vendor database 106 includes information concerning ratings or quality marks for specific vendors based on prior experience with other parties. Consequently, the parties can make an informed decision regarding potential third-party service providers.

Resolving issues using an LSP can be done through on-line web-based conference calls, e-mail, telephone calls, and/or in-person meetings. Resolving issues without the use of an LSP can be done using the same techniques.

After the issues are resolved by the parties, the parties enter the resolved information into the computer (using, for example, the computer form of the type shown in FIG. 13) and the computer stores the revised negotiation information into the lease database. Additionally, the computer can "lock in" the agreed items to prevent modification by either party. The result of phase two is a revised lease proposal with the agreed changes, which the computer generates upon command based on the revised negotiation information.

Once the parties have successfully completed the first and second phases of the negotiation, the computer system will allow them to proceed to the third negotiation phase. It should be understood that additional computer screens corresponding to the steps in FIG. 5 and the succeeding negotiation phases can be provided, although none are illustrated herein.

The third negotiation phase (agreement on lease deliverables) will be described with reference to FIG. 5. It will be appreciated that although some of the steps shown in FIGS. 5 through 11 appear to repeat some of the lease provisions that were the subject of an earlier negotiation phase, in practical terms any lease provision that was the subject of complete agreement in an earlier phase would be removed from later negotiation phases.

Figure 5:
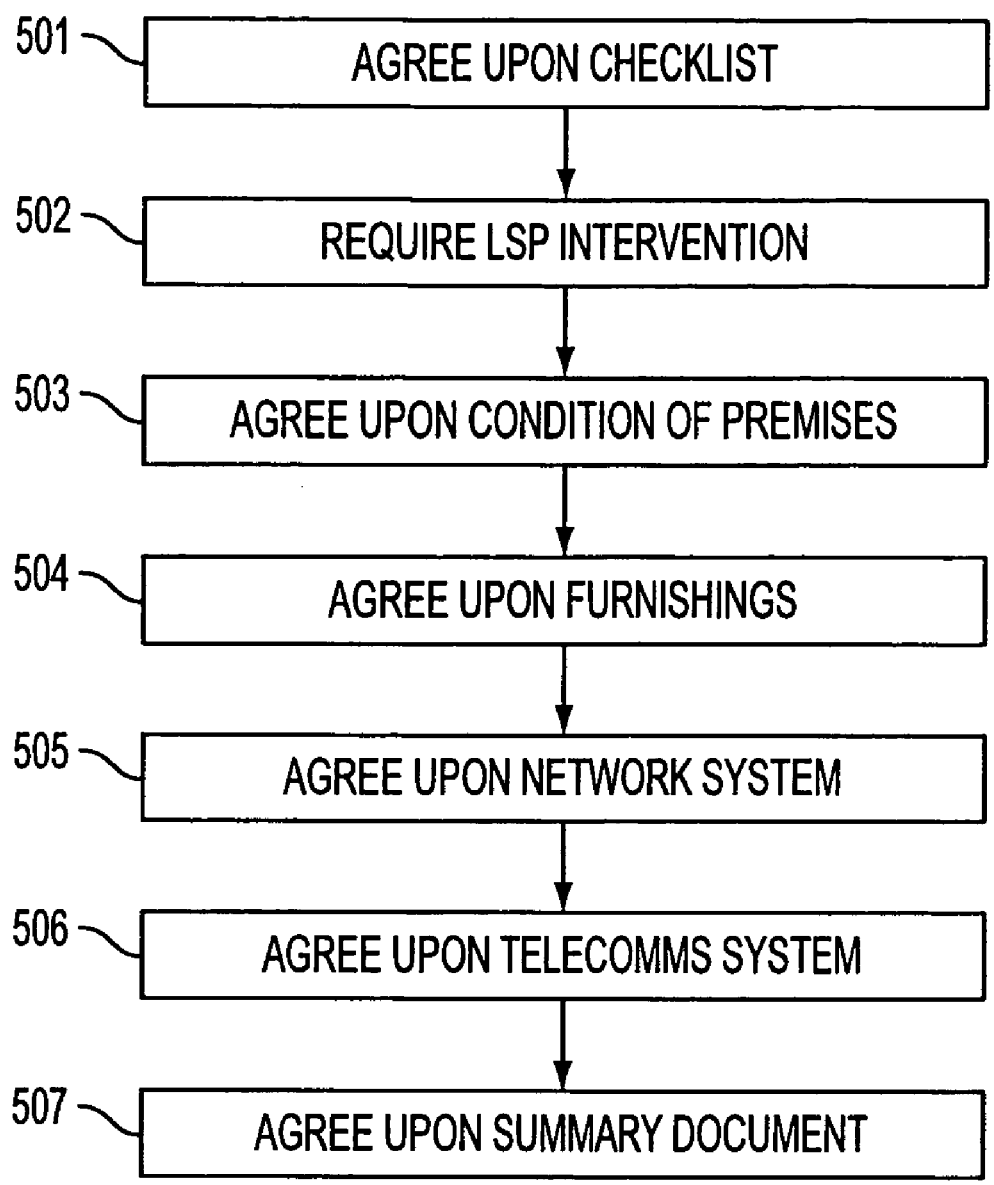
FIG. 5 shows additional details of the third phase.

Beginning with FIG. 5, in step 501 the parties agree upon a checklist (e.g., condition of the premises, furnishings, network systems, etc.). If these were already agreed to in an earlier negotiation phase, the computer would delete them from a later phase. In step 502, the parties agree upon the condition of the premises, indicating whether the premises will be delivered "as is," or with turnkey modifications or with other modifications. In step 503, if LSP intervention is needed, it is selected as described above. In step 504, the parties agree upon the furnishings (e.g., cafeteria equipment, furniture, etc.). In step 505, the parties agree upon a network system, and in step 506 they agree on a telecommunications system (using if necessary an LSP as per step 503). In step 507, the parties agree upon a summary document including the agreed deliverables and a completed lease proposal including schedule.

In one variation of the invention, a schedule calculator (FIG. 1A, element 111) calculates a proposed schedule corresponding to milestones during the negotiation and execution phase, based on average actual lengths of time stored in a database. In one variation, the lengths of time stored in the database are based on or derived from previously negotiated contracts (i.e., real-world practice is used to project future schedules). For example, if over the course of five different negotiated leases the average amount of time needed to go from generating a draft lease to moving into the leased property is two months, the scheduler would use that value to schedule such a milestone two months before the lease move-in date. The computer displays and prints a lease negotiation and execution schedule based on information provided by the parties and from databases of previously negotiated leases. FIG. 18 shows a computer-generated schedule for each phase of a nine-phase lease negotiation and execution process.

Figure 6:
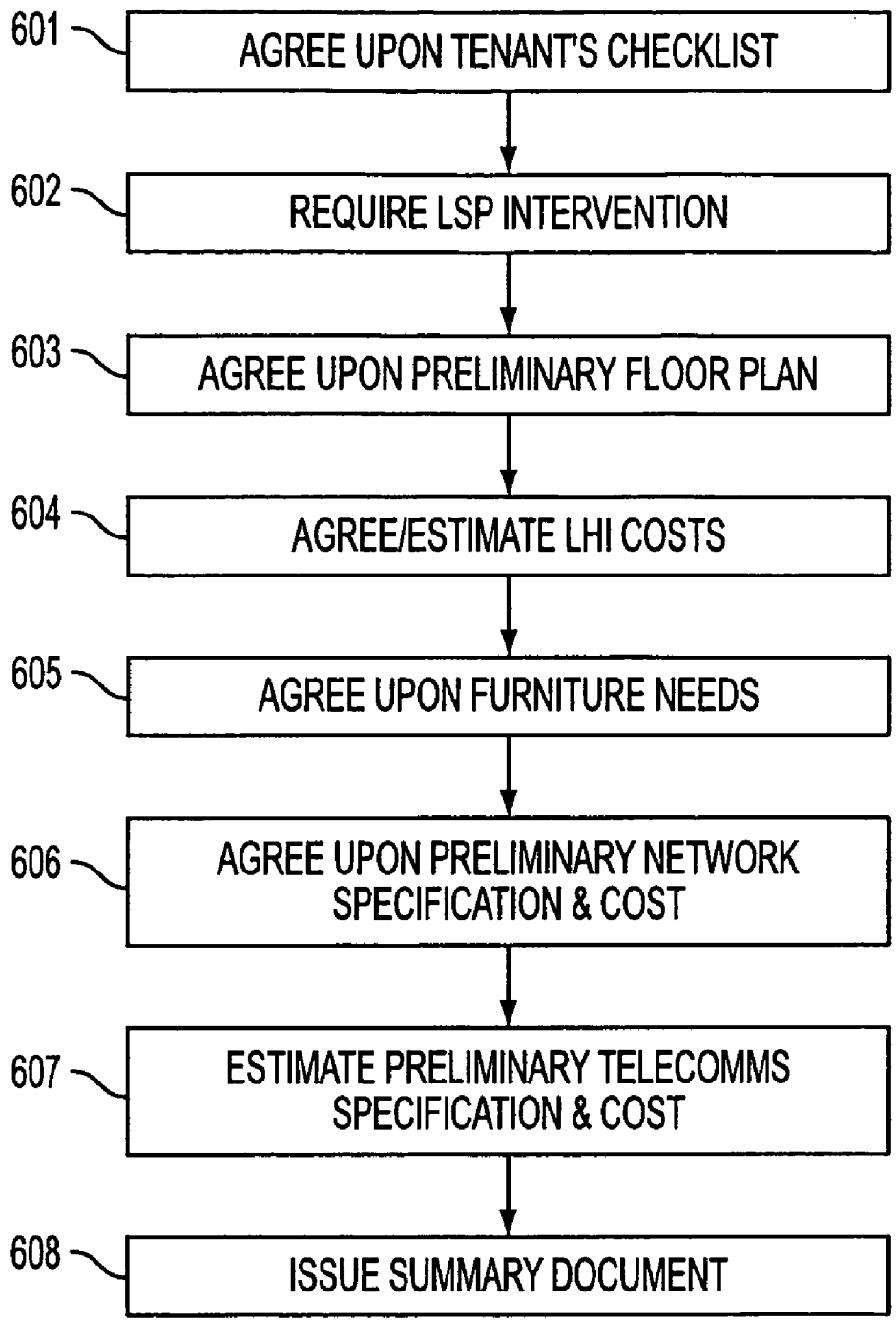
FIG. 6 shows additional details of the fourth phase.

The fourth phase (define tenant environment) will be explained with reference to FIG. 6. In step 601, the parties (including the tenant and its local service providers) agree upon a tenant's checklist. This can include an agreement on a floor plan, furniture needs and costs, and LHI (leasehold improvement) cost. Steps 602 through 607 are similar in nature to the other steps already discussed (i.e., the parties either agree or defer agreement on each item, and can resolve areas of disagreement using LSPs or other options). The result of negotiation in phase four is the issuance of a summary document including a checklist of outstanding tenant environment needs; a modified lease proposal; and a revised schedule (if necessary).

Figure 7:
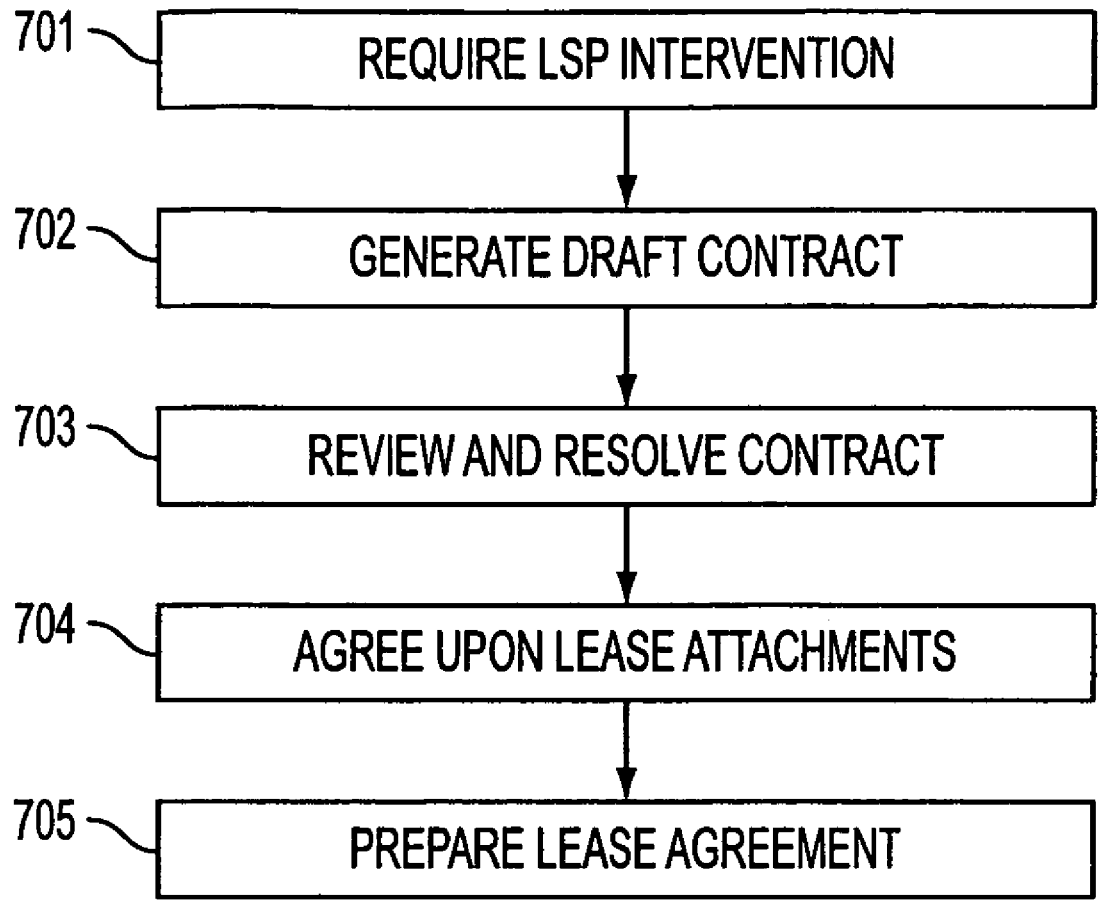
FIG. 7 shows additional details of the fifth phase.

The fifth phase (agreement on legal documents) will be described with reference to FIG. 7. In step 701, the parties agree to require intervention by LSPs (e.g., lawyers) if necessary. In step 702, a draft contract (lease) is generated by the computer on the basis of the negotiated information that was "locked in" by agreement of the parties. This step can be done using a document template populated with information from lease database 104. In step 703, the parties review and resolve the contract, including mediation if necessary. In step 704, the parties agree upon lease attachments such as a detailed description of office space, final plans and specifications. In step 705, a lease agreement is prepared. The result of the fifth phase is a lease that the parties agree on (but which has not yet been executed).

Figure 8:
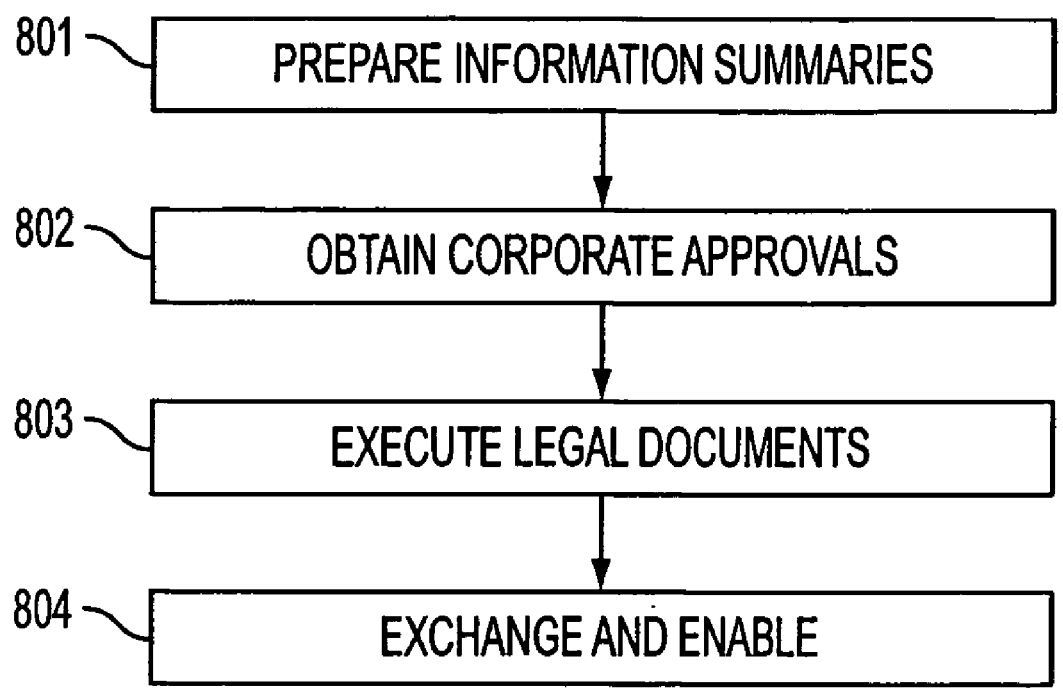
FIG. 8 shows additional details of the sixth phase.

The sixth phase (obtain approvals and execute documents) will be explained with reference to FIG. 8. In step 801, information summaries are prepared. If a corporate approval summary is required, a standard corporate approvals form is generated using information from the lease database. If a financial analysis is required, a standard financial analysis form is generated. In step 802, corporate approvals are obtained by each party. This includes steps of submitting the forms and information for internal approvals, obtaining signatures of local subsidiaries if required; and obtaining management signatures on the approval forms. In step 803, the legal documents are executed. This may include steps of identifying authorized signatories; transmitting original signature documents by e-mail, fax or express mail, and obtaining the actual signatures. In step 804, the parties exchange documents, pay required deposits, and exchange keys or other entrance mechanisms (security codes, etc.) The outcome of this phase is that all legal documents are executed and access is granted to the premises.

Figure 9:
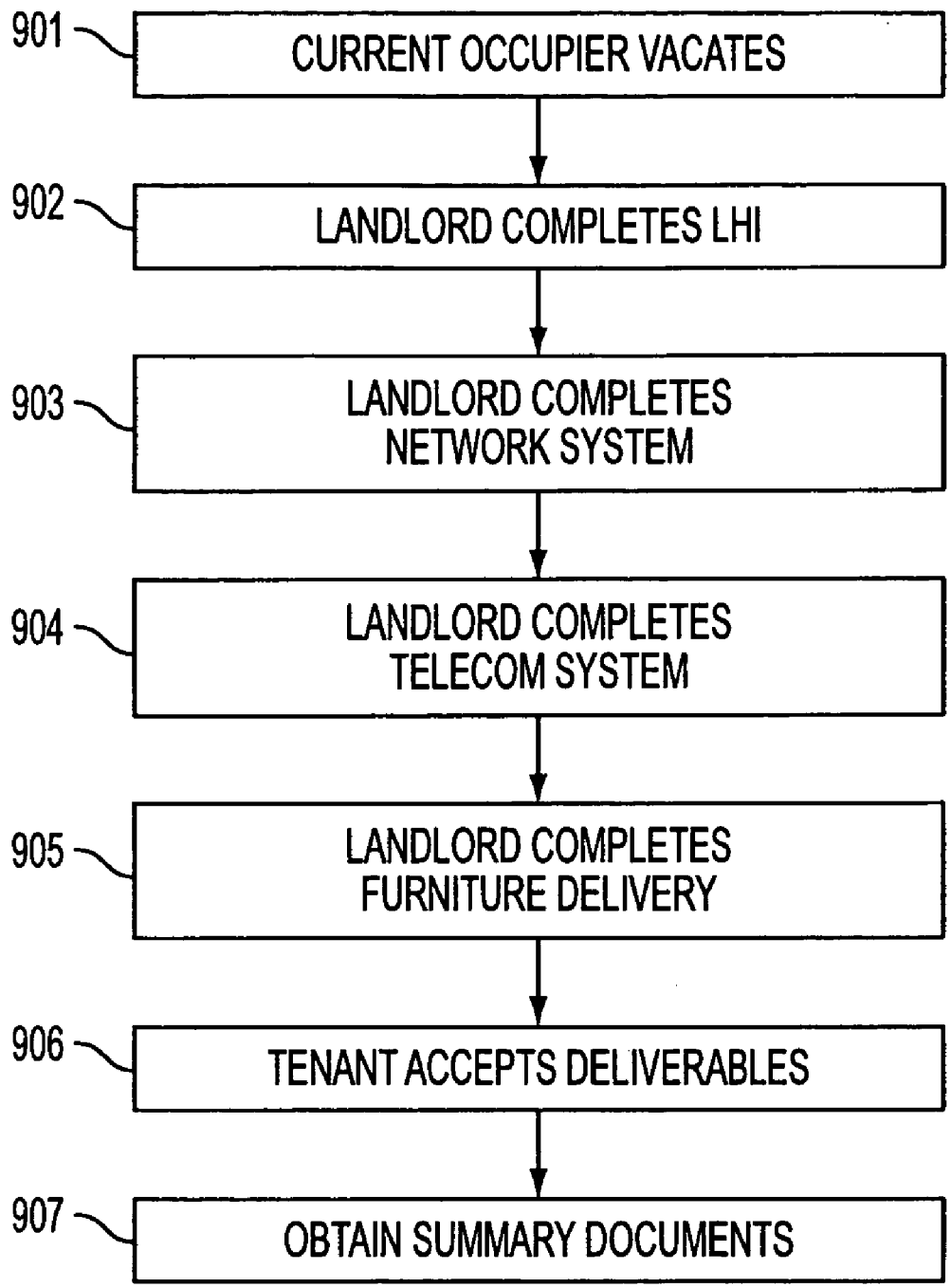
FIG. 9 shows additional details of the seventh phase.

The seventh phase (complete lease deliverables) will be explained with reference to FIG. 9. In step 901, the current occupier vacates the premises (if it has not already done so). In step 902, the landlord completes the leasehold investment required under the lease. In steps 903 and 904, the network and telecommunication systems are delivered in accordance with the lease. In step 905, the furniture is delivered and accepted. Any works for which the landlord is not responsible would be eliminated as decisions in this phase.

In step 906, the tenant formally accepts all of the above deliverables (to the extent that these were not accepted in the preceding steps); this may include steps of inspecting the premises, rectifying defects or variances, and providing a summary of delivered items.

Figure 10:
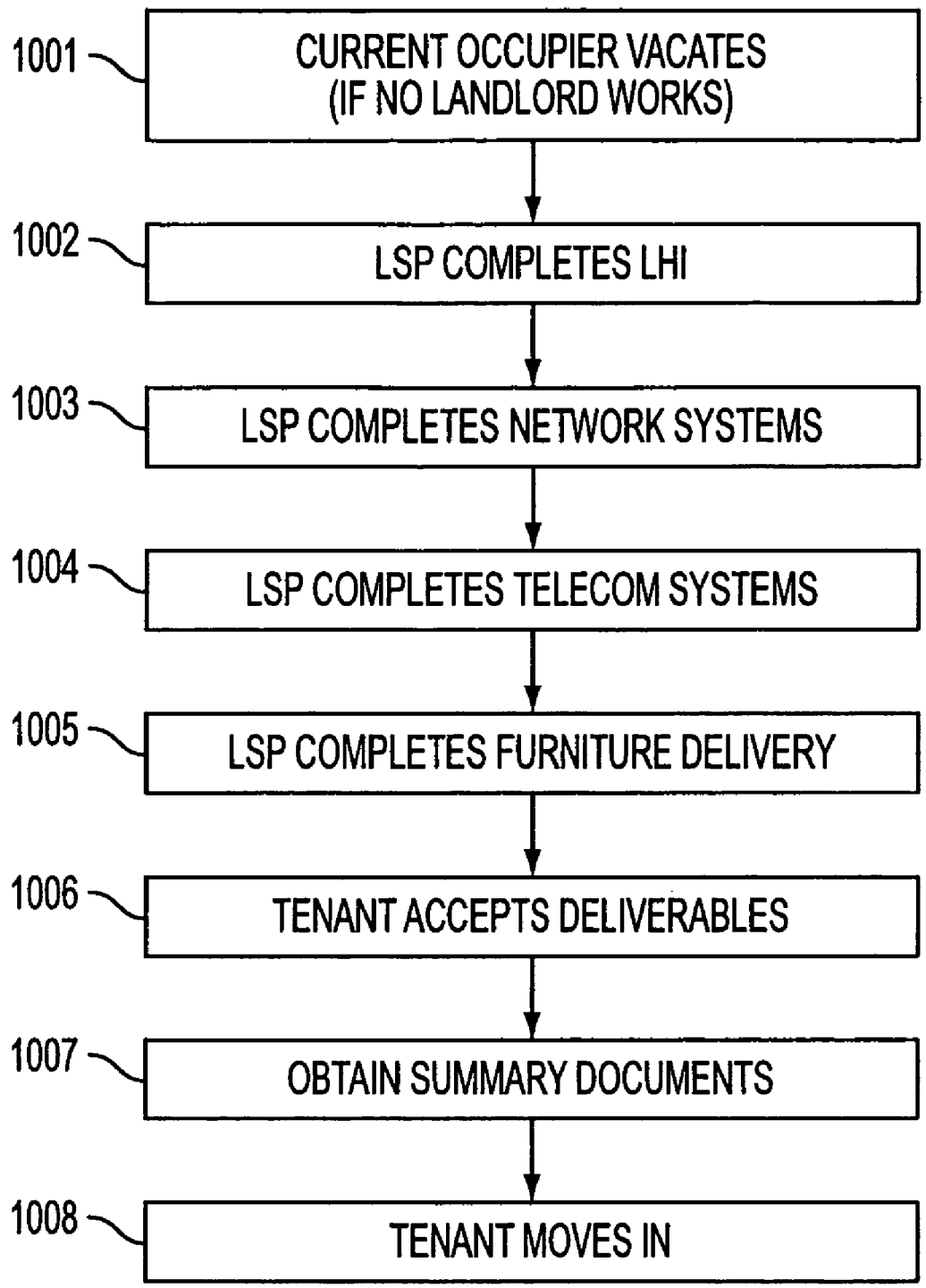
FIG. 10 shows additional details of the eighth phase.

The eighth phase (complete tenant works) will be explained with reference to FIG. 10. The steps shown in FIG. 10 relate to works that the tenant is completing without assistance of the landlord. As such, the decisions in this phase involve only the tenant and its LSPs (although, in practice, the tenant may require the landlord's cooperation to resolve issues related to installation of tenant systems in the premises). Any steps that are completed by the landlord on behalf of the tenant in phase seven would be automatically eliminated from phase eight. Once all of the tenant's works are completed, the tenant would move into the new premises.

Figure 11:
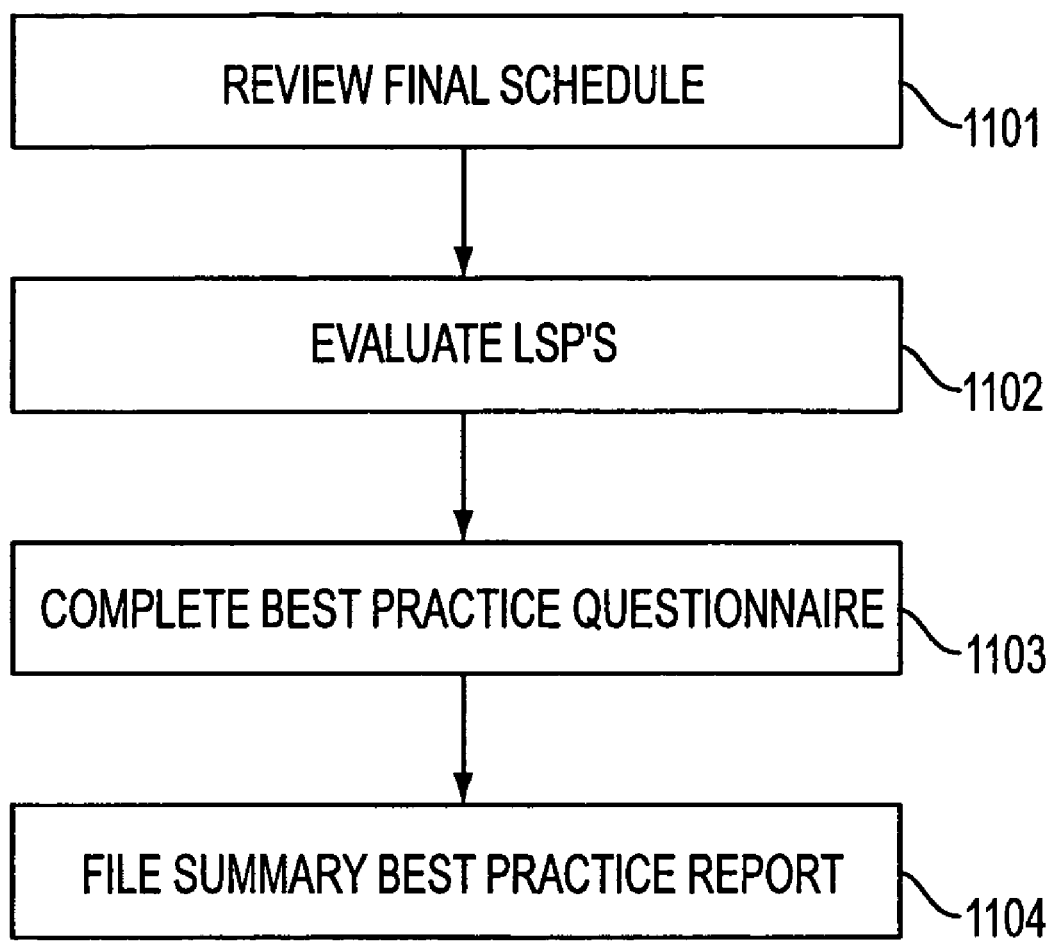
FIG. 11 shows additional details of the ninth phase.

The ninth phase (issue best practice report) will be explained with reference to FIG. 11. In this phase, the parties review the negotiation process for evaluation purposes, particularly with a view to building a database that can be used by parties in future negotiations. In step 1101, the final schedule is reviewed and accepted with comments. The final schedule will show the variation between the initial and actual schedules, and the computer will prompt the parties to indicate the reasons for the variances. In step 1102, the parties evaluate LSPs that were used during the negotiation process (e.g., mediators, architects, lawyers), and the evaluation information is stored in a database. In step 1103, a best practice questionnaire is completed by each party. The questionnaire may include questions soliciting successes; problem areas identifying locality-specific difficulties encountered during the process (e.g., difficulties in completing legal documents in London); and improvement suggestions. The results are stored in a computer database. Finally, in step 1104 a best practice report is generated and stored in a database. In one variation, the best practice report is generated using a document template that extracts answers to questions and information from the lease negotiation process. The report can be viewed by parties to a future negotiation to help in a transaction.

FIG. 16 shows a computer-generated lease proposal that can be filled in by one or both of the parties. In one variation of the invention, if the parties have already begun discussions, they could use a form such as that shown in FIG. 16 to enter information regarding the proposal without having to go through a more detailed agree/defer process illustrated in FIGS. 13 through 15.

Thus has been described a system and method for negotiating a lease using a computer network. Reference numerals in the appended method claims identifying steps are for convenience only and are not intended to imply a necessary ordering of the steps. It is, therefore, to be understood that within the scope of the appended claims the invention may be practiced otherwise than as specifically described. No claim should be interpreted to be in means-plus-function format.

The invention claimed is:

1. A computer-assisted method of negotiating a real estate lease transaction, comprising the steps of:
   (1) displaying on a computer screen a plurality of lease provisions and a plurality of predefined actions associated with each lease provision, wherein the plurality of lease provisions are associated with a first phase of a lease negotiation;
   (2) for each of a plurality of negotiators to the lease transaction, selecting one of the plurality of predefined actions associated with each lease provision; and
   (3) for each lease provision, determining whether each of the plurality of negotiators has selected the same associated predefined action and, if so, storing in the computer an indication of the associated lease provision as an agreed provision and, if not, deferring non-agreed lease provisions to a later phase of the lease negotiation.

2. The computer-assisted method of claim 1, wherein step (2) comprises the step of selecting either an AGREE choice or a DEFER choice for each lease provision.

3. The computer-assisted method of claim 1, wherein steps (1) and (2) are performed at a prospective tenant's computer during a first time period, and wherein steps (1) and (2) are performed at a prospective landlord's computer during a second time period.

4. The computer-assisted method of claim 1, wherein step (2) further comprises the step of receiving from at least one of the negotiators a numerical value pertaining to at least one of the lease provisions.

5. The computer-assisted method of claim 4, further comprising the step of converting in the computer the numerical value from a first unit of measure to a second unit of measure and displaying the second unit of measure.

6. The computer-assisted method of claim 4, further comprising the step of converting in the computer the numerical value from a first unit of currency to a second unit of currency and displaying the second unit of currency.

7. The computer-assisted method of claim 1, further comprising the step of selecting a third-party service provider from a computer database, wherein the third-party service provider is selected from a geographic area to which the lease pertains.

8. The computer-assisted method of claim 7, further comprising the step of electronically transmitting to the third-party service provider a request for services pre-populated with information pertaining to the lease negotiation.

9. The computer-assisted method of claim 8, wherein the third-party service provider is an architect, and wherein the electronically transmitted request pertains to a floor plan for the lease.

10. The computer-assisted method of claim 1, further comprising the step of completing an evaluation form for the negotiation and generating a report based on the evaluation form.

11. The computer-assisted method of claim 1, further comprising the step of:
   (4) in the later negotiation phase, resolving lease provisions that were deferred from the first negotiation phase.

12. The computer-assisted method of claim 1, further comprising a step of automatically generating an intermediate document that summarizes points of agreement in the negotiation.

13. The computer-assisted method of claim 1, wherein steps (1) and (2) are performed over the Internet using web browsers by negotiators located at two different locations.

14. A system that facilitates the negotiation of a real estate lease between a tenant and a landlord, comprising a computer system programmed with software that generates a display of a plurality of lease provisions and a plurality of predefined actions associated with each lease provision, wherein the plurality of lease provisions are associated with a first phase of a lease negotiation;
   wherein the software receives choices from the tenant and the landlord for each lease provision pertaining to one of the predefined actions and, for each lease provision, determines whether the tenant and landlord have indicated agreement and, if so, stores in the computer an indication of the agreed lease provisions and, if not, defers non-agreed lease provisions to a later phase of the lease negotiation.

15. The system of claim 14, wherein the software receives choices from the tenant located at a first computer during a first time period and receives choices from the landlord located at a second computer during a second time period.

16. The system of claim 14, wherein the software converts a numerical value relating to one of the lease provisions from a first unit of measure to a second unit of measure.

17. The system of claim 14, wherein the software converts a numerical value relating to one of the lease provisions from a first unit of currency to a second unit of currency.

18. The system of claim 14, wherein the software suggests a third-party service provider from a computer database based on the geographic area of the lease.

19. The system of claim 18, wherein the software electronically transmits to the third-party service provider a request for services pre-populated with information pertaining to the lease negotiation.

20. The system of claim 14, wherein the software receives evaluation information from the tenant and the landlord and generates a report based on the evaluation information.

21. The system of claim 14, wherein the software prompts the tenant and landlord to resolve in a later negotiation phase lease provisions that were deferred from an earlier phase.

22. The system of claim 14, wherein the software automatically generates an intermediate document that summarizes points of agreement in the negotiation.

23. A computer-assisted method of negotiating a real estate lease, comprising the steps of:
   (1) displaying on a first computer display device a plurality of lease provisions and a plurality of predefined actions associated with each lease provision, and receiving from a first party information selecting one of the predefined actions for each lease provision;
(2) displaying on a second computer display device the plurality of lease provisions and the plurality of predefined actions associated with each lease provision, and receiving from a second party information selecting one of the predefined actions for each lease provision;
(3) determining those lease provisions for which the first and second parties have selected the same predefined action; and
(4) for those lease provisions for which the first and second parties have not selected the same predefined action, assisting the first and second parties in reaching agreement.

24. The method of claim 23, wherein step (4) comprises the step of generating a request for services from a local service provider.

25. The method of claim 23, further comprising the step of converting a value associated with one of the lease provisions from a first unit of measure to a second unit of measure and displaying the second unit of measure.

26. The method of claim 23, wherein step (4) comprises the step of suggesting a value for a lease provision that is a compromise between a value offered by the first party and a value offered by the second party.

27. The method of claim 23, further comprising the step of preventing the first party and the second party from modifying any lease provision for which the parties have selected the same predefined action.

28. A computer-implemented method of generating a report reflecting difficulties encountered during a computer-assisted lease negotiation, comprising the steps of:
(1) displaying on a first computer display device a plurality of lease provisions and a plurality of predefined actions associated with each lease provision, and receiving from a first party information selecting one of the predefined actions for each lease provision;
(2) displaying on a second computer display device the plurality of lease provisions and the plurality of predefined actions associated with each lease provision, and receiving from a second party information selecting one of the predefined actions for each lease provision;
(3) negotiating between the first and second parties to reach agreement on at least one of the lease provisions for which the first and second party did not reach agreement;
(4) receiving from each party an evaluation form including information relating to the lease negotiation process; and
(5) generating a report including information received from the evaluation form.

29. A computer-assisted method of negotiating a real estate agreement, comprising the steps of:
(1) displaying on a computer screen a plurality of predefined real estate agreement provisions each relating to one aspect of a potential real estate agreement, each provision having an associated displayed choice including at least an agreement choice and a deferral choice;
(2) for each of a plurality of negotiators to the real estate agreement, detecting each negotiator's computer selection of one of the plurality of displayed choices for each of the predefined real estate agreement provisions;
(3) for each predefined real estate agreement provision, determining whether each of the plurality of negotiators has selected the same displayed choice and, for each such same choice, storing in a computer an indication of agreement regarding the associated agreement provision.

30. The computer-assisted method of claim 29, wherein each of the predefined real estate agreement provisions relates to a real estate lease provision.

31. The computer-assisted method of claim 29, wherein step (1) comprises the step of displaying the predefined real estate agreement provisions grouped into distinct negotiation phases.

32. The computer-assisted method of claim 29, wherein step (1) is performed on two computers each located at a different geographic location, wherein each negotiator selects choices during different time periods.

33. The computer-assisted method of claim 29, wherein steps (1) to (3) are performed during a first negotiation period, and further comprising the steps of:
(4) during a later negotiation period, re-displaying real estate agreement provisions for which agreement was not reached during the first negotiation period, and repeating steps (2) and (3) for all such provisions.

34. The computer-assisted method of claim 29, wherein step (1) comprises the step of displaying each of the plurality of real estate agreement provisions simultaneously on a single computer screen.

35. The computer-assisted method of claim 29, wherein step (1) comprises the step of displaying each of the plurality of real estate agreement provisions successively on separate computer screens.

36. A computer programmed with computer software that carries out steps (1) to (3) of claim 35.

37. A computer-assisted method of negotiating an agreement over a computer network, comprising the steps of:
(1) displaying on a first computer screen a plurality of predefined agreement provisions each relating to one aspect of a potential agreement, each provision having an associated displayed choice including at least an agreement choice and a deferral choice;
(2) detecting a first negotiator's computer selection of one of the plurality of displayed choices for each of the predefined agreement provisions;
(3) displaying on a second computer screen the plurality of predefined agreement provisions displayed on the first computer screen and a second plurality of associated displayed choices including at least an agreement choice and a deferral choice;
(4) detecting a second negotiator's computer selection of one of the plurality of displayed choices displayed on the second computer screen;
(5) determining whether the first and second negotiators have selected a same displayed choice for each predefined agreement provision and, for each such same choice, storing in a computer memory an indication of agreement regarding the associated agreement provision.

38. The computer-assisted method of claim 37, wherein step (1) comprises the step of displaying the predefined agreement provisions grouped into distinct negotiation phases.

39. The computer-assisted method of claim 37, wherein step (3) comprises the step of further displaying on the second computer screen one or more computer selections made by the first negotiator.

40. The computer-assisted method of claim 37, wherein step (1) is performed on two computers each located at a different geographic location, wherein each negotiator selects choices during different time periods.

41. The computer-assisted method of claim 37, wherein steps (1) to (4) are performed during a first negotiation period, and further comprising the steps of:
(6) during a later negotiation period, re-displaying agreement provisions for which agreement was not reached during the first negotiation period, and repeating steps (1) through (4) for all such provisions.

42. The computer-assisted method of claim 37, wherein step (2) comprises the step of receiving a first ancillary value from the first negotiator representing a first proposed contract value corresponding to one of the predefined agreement provisions; wherein step (4) comprises the step of receiving a second ancillary value from the second negotiator representing a second proposed contract value corresponding to one of the predefined agreement provisions; wherein the method further comprises the step of:
(6) if the first ancillary value and the second ancillary value are different, generating a message identifying a discrepancy.

43. The computer-assisted method of claim 37, wherein step (2) comprises the step of receiving a first ancillary value from the first negotiator representing a first proposed contract value corresponding to one of the predefined agreement provisions; wherein step (4) comprises the step of receiving a second ancillary value from the second negotiator representing a second proposed contract value corresponding to one of the predefined agreement provisions;
wherein the method further comprises the step of:
(6) if the first ancillary value and the second ancillary value are different, proposing a third ancillary value representing a compromise between the first ancillary value and the second ancillary value.

44. A computer readable medium storing computer readable instructions that, when executed by a processor, cause a computer to perform steps (1) to (3) of claim 29.

45. A computer-readable medium comprising computer instructions that, when executed by a computer, perform the steps of:
(1) displaying on a first computer display device a plurality of lease provisions and a plurality of predefined actions associated with each lease provision, and receiving from a first party information selecting one of the predefined actions for each lease provision;
(2) displaying on a second computer display device the plurality of lease provisions and the plurality of predefined actions associated with each lease provision, and receiving from a second party information selecting one of the predefined actions for each lease provision;
(3) determining those lease provisions for which the first and second parties have selected the same predefined action; and
(4) for those lease provisions for which the first and second parties have not selected the same predefined action, assisting the first and second parties in reaching agreement.

46. A computer programmed with computer software that carries out steps of:
(1) displaying on a first computer screen a plurality of predefined agreement provisions each relating to one aspect of a potential agreement, each provision having an associated displayed choice including at least an agreement choice and a deferral choice;
(2) detecting a first negotiator's computer selection of one of the plurality of displayed choices for each of the predefined agreement provisions;
(3) displaying on a second computer screen the plurality of predefined agreement provisions displayed on the first computer screen and a second plurality of associated displayed choices including at least an agreement choice and a deferral choice;
(4) detecting a second negotiator's computer selection of one of the plurality of displayed choices displayed on the second computer screen;
(5) determining whether the first and second negotiators have selected a same displayed choice for each predefined agreement provision and, for each such same choice, storing in a computer memory an indication of agreement regarding the associated agreement provision.

47. A computer readable medium storing computer readable instructions that, when executed by a processor, cause a computer to perform steps of:
(1) displaying on a first computer screen a plurality of predefined agreement provisions each relating to one aspect of a potential agreement, each provision having an associated displayed choice including at least an agreement choice and a deferral choice;
(2) detecting a first negotiator's computer selection of one of the plurality of displayed choices for each of the predefined agreement provisions;
(3) displaying on a second computer screen the plurality of predefined agreement provisions displayed on the first computer screen and a second plurality of associated displayed choices including at least an agreement choice and a deferral choice;
(4) detecting a second negotiator's computer selection of one of the plurality of displayed choices displayed on the second computer screen;
(5) determining whether the first and second negotiators have selected a same displayed choice for each predefined agreement provision and, for each such same choice, storing in a computer memory an indication of agreement regarding the associated agreement provision.

48. A computer-assisted method of negotiating a real estate lease transaction, comprising the steps of:
(1) displaying on a computer screen a plurality of lease provisions and a plurality of predefined actions associated with each lease provision, wherein the plurality of lease provisions are associated with a first phase of a lease negotiation and wherein the plurality of predefined actions comprise an AGREE choice and a DEFER choice for each lease provision;
(2) for each of a plurality of negotiators to the lease transaction, selecting either the AGREE choice or the DEFER choice for each lease provision; and
(3) for each lease provision, determining whether each of the plurality of negotiators has selected the same associated predefined action and, if so, storing in the computer an indication of the associated lease provision as an agreed provision and, if not, deferring non-agreed lease provisions to a later phase of the lease negotiation.

49. A computer-assisted method of negotiating a real estate agreement, comprising the steps of:
(1) in a first phase of a multiphase transaction wherein phases comprise predefined actions, displaying on a computer screen a plurality of predefined real estate agreement provisions each relating to one aspect of a potential real estate agreement, each provision having its own set of predefined actions associated and displayed therewith, each set of predefined actions including at least an agreement choice and a deferral choice;

(2) for each of a plurality of negotiators to the real estate agreement, detecting each negotiator's computer input representative of its selection of one of the predefined actions for each of the predefined real estate agreement provisions;

(3) for each predefined real estate agreement provision, determining whether each of the plurality of negotiators has selected the agreement choice and, when each of the plurality of negotiators has selected the agreement choice, storing in a computer an indication of agreement regarding the associated agreement provision.

50. A computer-assisted method of negotiating a real estate agreement, comprising the steps of:

(1) in a first phase of a multiphase transaction wherein each phase prescribes a predefined structure and sequence of questions to be answered, displaying on a computer screen a plurality of predefined real estate agreement provisions each relating to one aspect of a potential real estate agreement, each provision having its own set of predefined actions associated and displayed therewith, each set of predefined actions including at least an agreement choice and a deferral choice;

(2) for each of a plurality of negotiators to the real estate agreement, detecting each negotiator's computer input representative of its selection of one of the predefined actions for each of the predefined real estate agreement provisions;

(3) for each predefined real estate agreement provision, determining whether each of the plurality of negotiators has selected the agreement choice and, when each of the plurality of negotiators has selected the agreement choice, storing in a computer an indication of agreement regarding the associated agreement provision.

51. The computer assisted method of claim 50, wherein the predefined structure and sequence of questions for the first phase is different than the predefined structure and sequence of questions for a second phase.

52. The computer assisted method of claim 50, further comprising the step of automatically generating a legal document based on agreements reached by the negotiators.

53. A computer-assisted method of negotiating a real estate lease, comprising the steps of:

(1) outputting for display on a computer screen a plurality of lease criteria including:
   a. an amount of currency to be paid per predefined period during the lease,
   b. an amount of square footage to be leased,
   c. a beginning date of the lease, and
   d. a term of the lease; and (2) displaying a plurality of predefined actions associated with a first phase of a lease negotiation including, for each lease criteria:
   a. an AGREE choice and a DEFER choice to be selected by a landlord negotiator, and
   b. an AGREE choice and a DEFER choice to be selected by a tenant negotiator;

(3) receiving input from the landlord negotiator and the tenant negotiator each selecting either the AGREE choice or the DEFER choice for each lease criteria;

(4) for each lease criteria, determining whether each of the plurality of negotiators has selected the AGREE choice and, if so, storing in the computer an indication of the associated lease criteria as an agreed provision and, if not, deferring non-agreed lease criteria to a later phase of the lease negotiation; and (5) when requested by user input, generating for display a summary document comprising agreed provisions.

54. The computer-assisted method of claim 53, wherein step (1) further comprises displaying an input box corresponding to one of the lease provisions, wherein a negotiator enters comments corresponding to the lease provision in the input box.

\* \* \* \* \*